United States Patent [19]
Toyoda et al.

[11] Patent Number: 6,021,223
[45] Date of Patent: Feb. 1, 2000

[54] IMAGE FORMING APPARATUS

[75] Inventors: Haruyoshi Toyoda, Hamamatsu; Jesper Glückstad, Osaka, both of Japan

[73] Assignees: Hamamatsu Photonics K.K., Hamamatsu, Japan; Riso National Laboratory, Roskilde, Denmark

[21] Appl. No.: 08/962,446

[22] Filed: Oct. 31, 1997

[30] Foreign Application Priority Data

Nov. 1, 1996 [JP] Japan ................................ 8-292143
Jul. 17, 1997 [JP] Japan ................................ 9-192577

[51] Int. Cl.$^7$ .................................................. G06K 9/74
[52] U.S. Cl. ................................. 382/214; 359/237
[58] Field of Search ................................ 382/210, 211, 382/214; 359/237, 240

[56] References Cited

U.S. PATENT DOCUMENTS

| | | | |
|---|---|---|---|
| 3,598,471 | 8/1971 | Baldwin et al. | 350/162 |
| 5,090,795 | 2/1992 | O'Meara et al. | 359/240 |
| 5,214,534 | 5/1993 | Kallman et al. | 359/561 |
| 5,418,598 | 5/1995 | Fukuda et al. | 355/66 |

FOREIGN PATENT DOCUMENTS

| | | |
|---|---|---|
| 0475659 | 3/1992 | European Pat. Off. . |
| 0657760 | 6/1995 | European Pat. Off. . |
| WO 96/34307 | 10/1996 | WIPO . |

OTHER PUBLICATIONS

J. Gluckstad, "Phase Contrast Image Synthesis", Optics Communications, vol. 130, No. 4, Oct. 1, 1996, pp. 225–230.

J. Gluckstad, "Adaptive Array Illumination and Structured Light Generated by Spatial Zero–Order Self–Phase Modulation in a Kerr Medium" Optics Communications 120 (1995) pp. 194–203.

J. Gluckstad, "Phase Contrast Image Synthesis" Optics Communications 130 (1996) pp. 225–230.

"Spatial Light Modulator and Optical Analog Arithmetics", OplusE, Mar. 1995, No. 184, Published by Shin Gijyutsu Communications Kabushiki Kaisha.

Imai et al, "Phase Modulation Characteristics of Twisted Nematic Liquid Crystal Panel with Circularly Polarized Light" Imaging Science and Engineering Laboratory, Tokyo Institute of Technology, Received Mar. 30, 1992.

Proceedings, SPIE—The International Society for Optical Engineering, Nov. 4–5 1996, pp. 109–114 vol. 2885.

Primary Examiner—Christopher S. Kelley
Attorney, Agent, or Firm—Pillsbury Madison & Sutro LLP

[57] ABSTRACT

An image H(x, y) for displaying a target image G(x, y) is displayed on a liquid-crystal display panel and illumination light from an illumination light source is made to pass therethrough to form an image on a PALSLM. Read light hv is radiated to the PALSLM and a phase-modulated light image α(x, y) read out of the PALSLM is subjected to Fourier transform by a lens. A phase contrast filter gives a predetermined phase shift to only the zero-order light component of Fourier light image $α_f(x, y)$. The phase-shifted light image is subjected to inverse Fourier transform by a lens to project an output image O(x, y) to an output plane. A light image O'(x, y) branched by a beam sampler is picked up by a pickup device and an evaluation value calculating unit evaluates conformity between the image O(x, y) and the image G(x, y). A control unit performs feedback control of optical characteristics of the illumination light source, PALSLM, and phase contrast filter, based on the evaluation result.

25 Claims, 25 Drawing Sheets

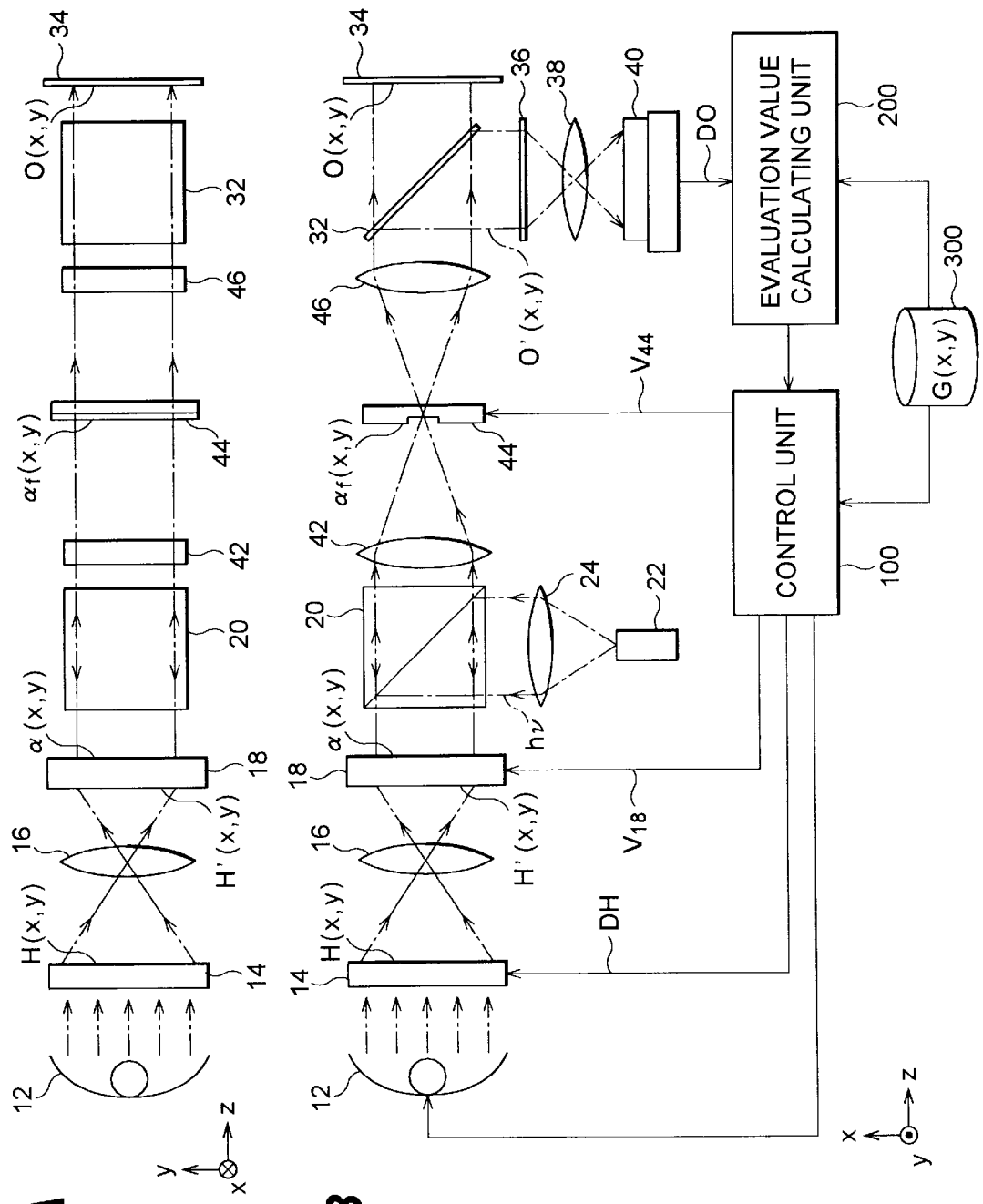

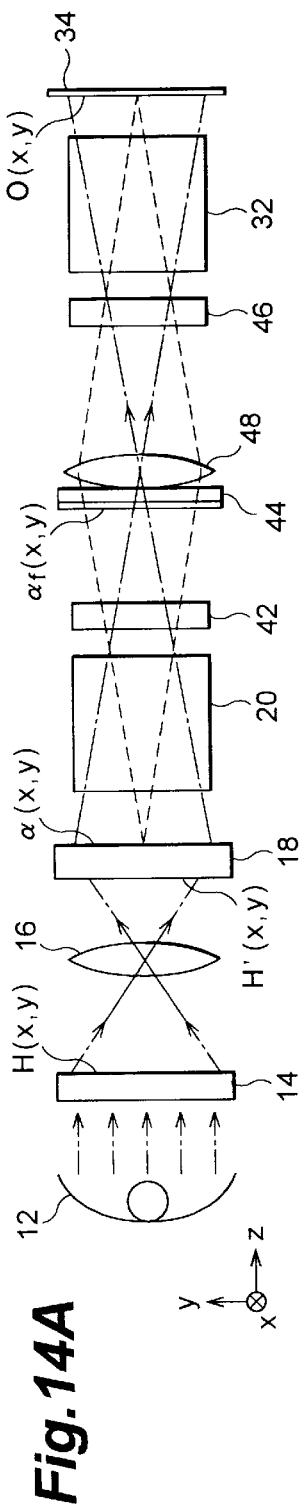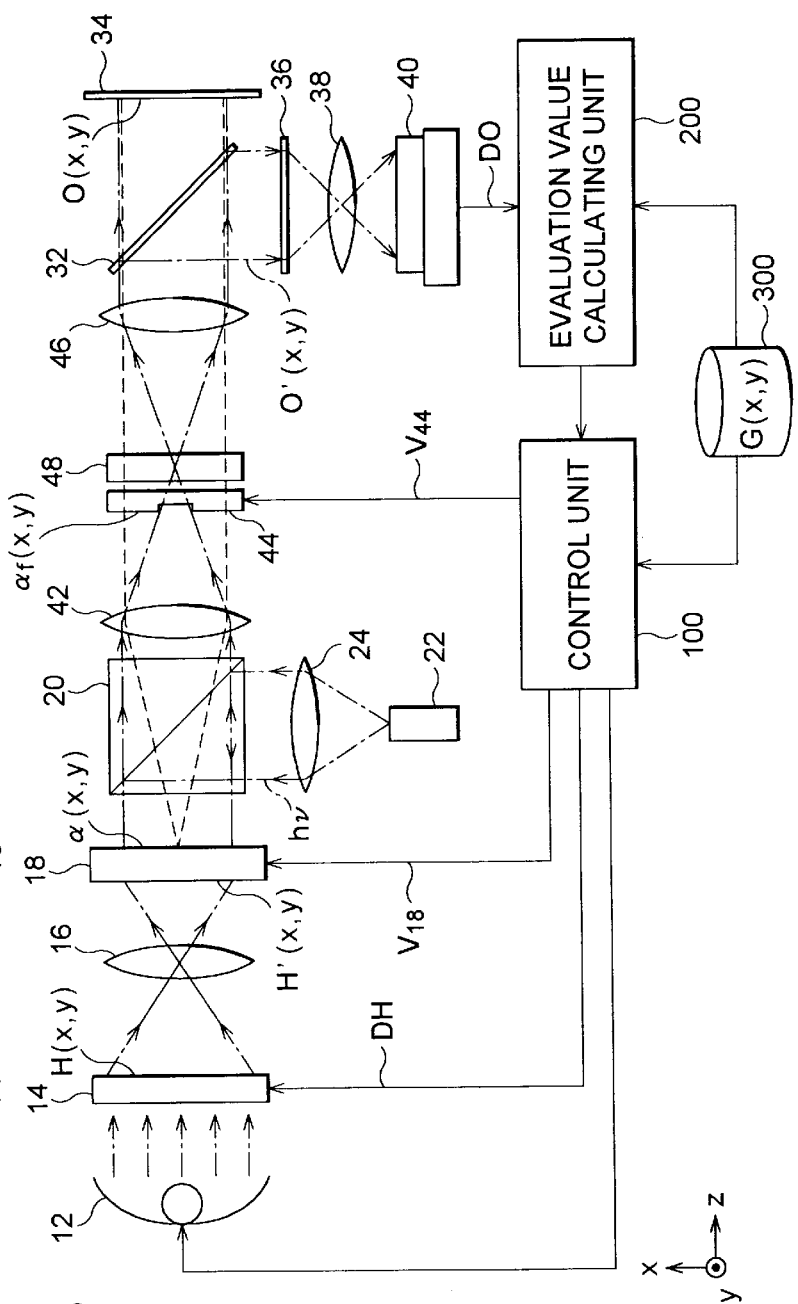
Fig. 14A
Fig. 14B

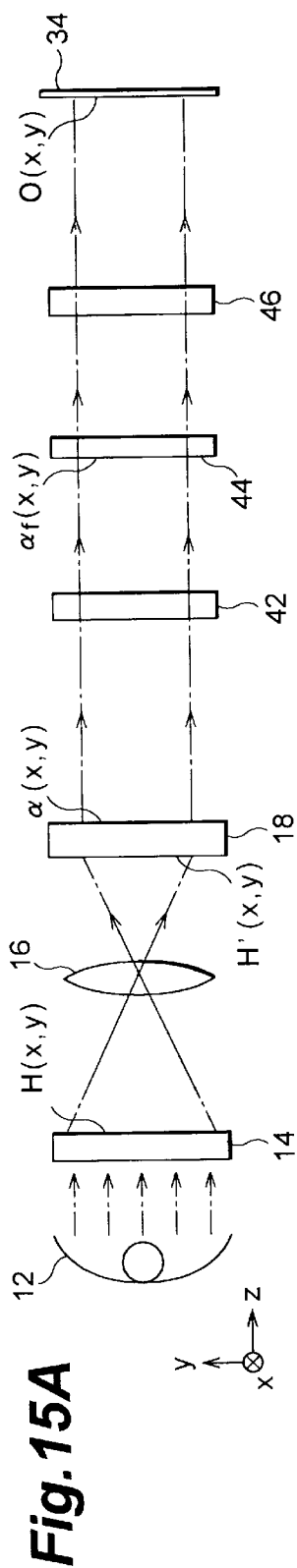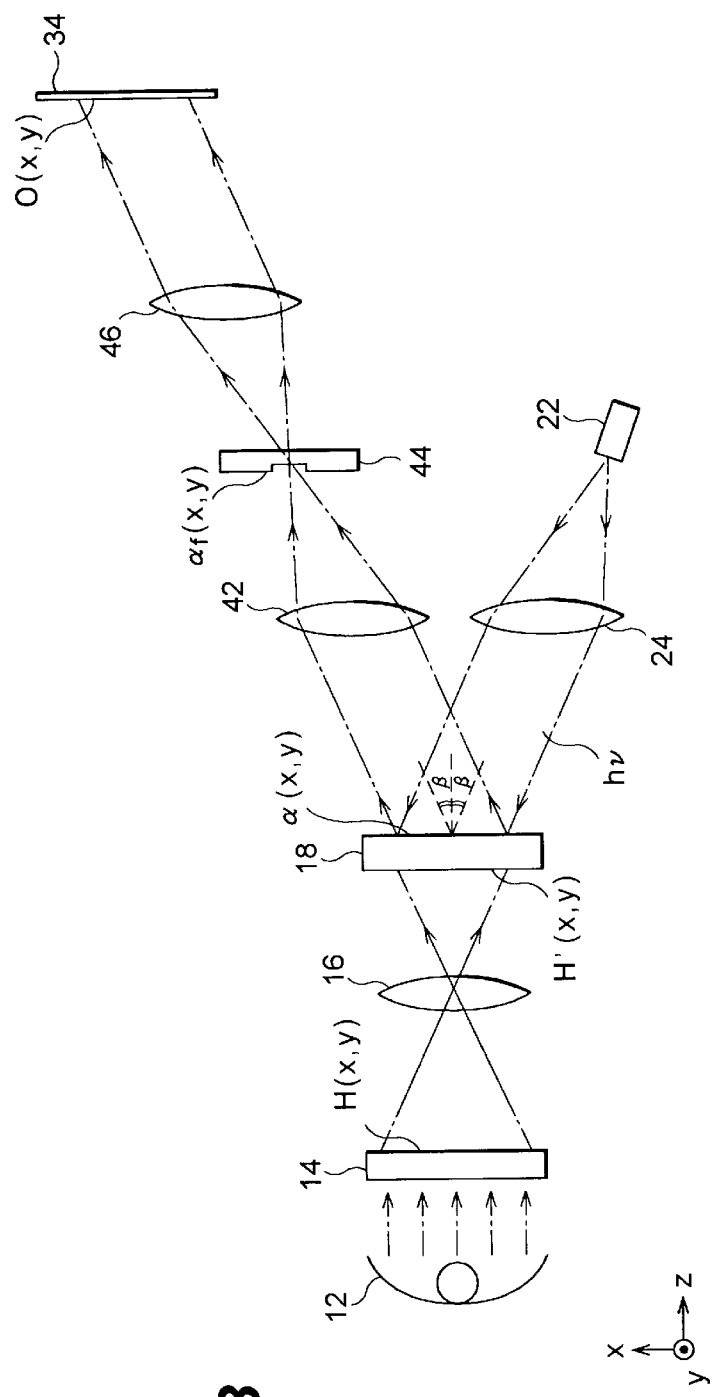
Fig. 15A
Fig. 15B

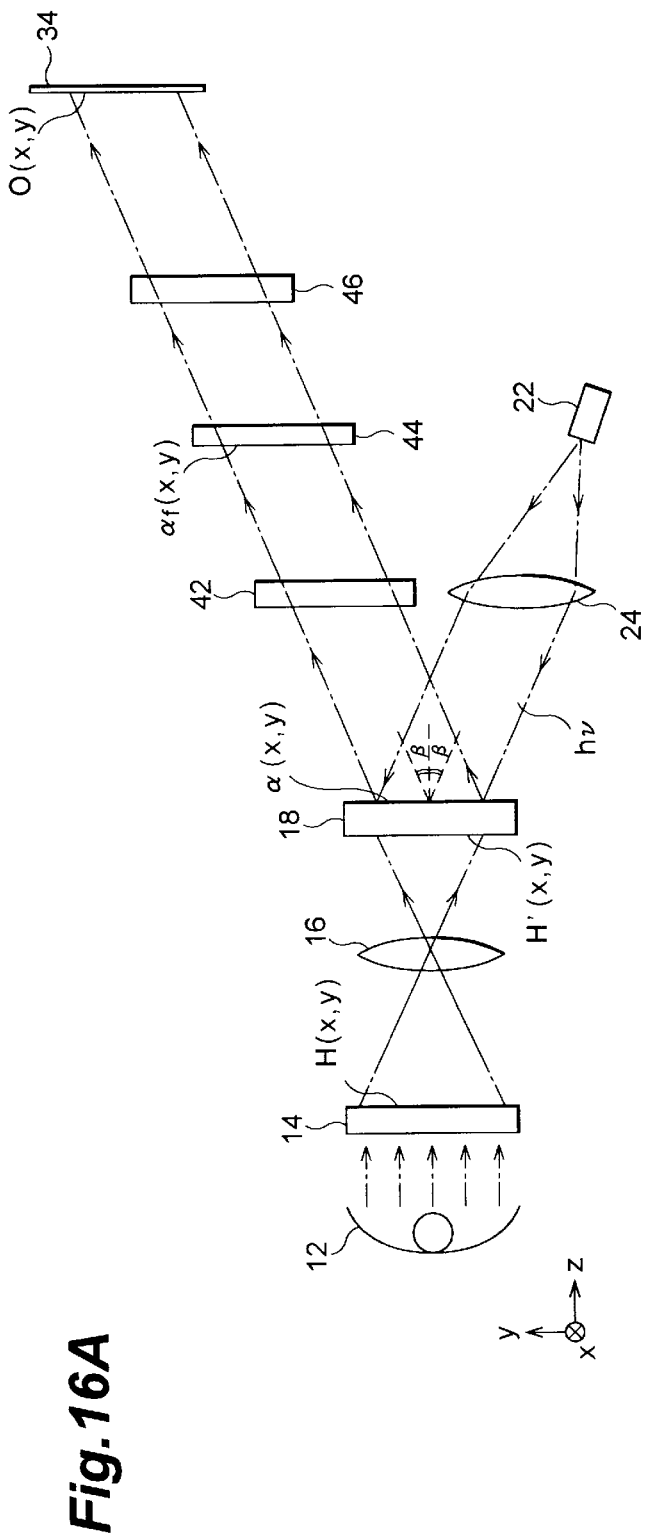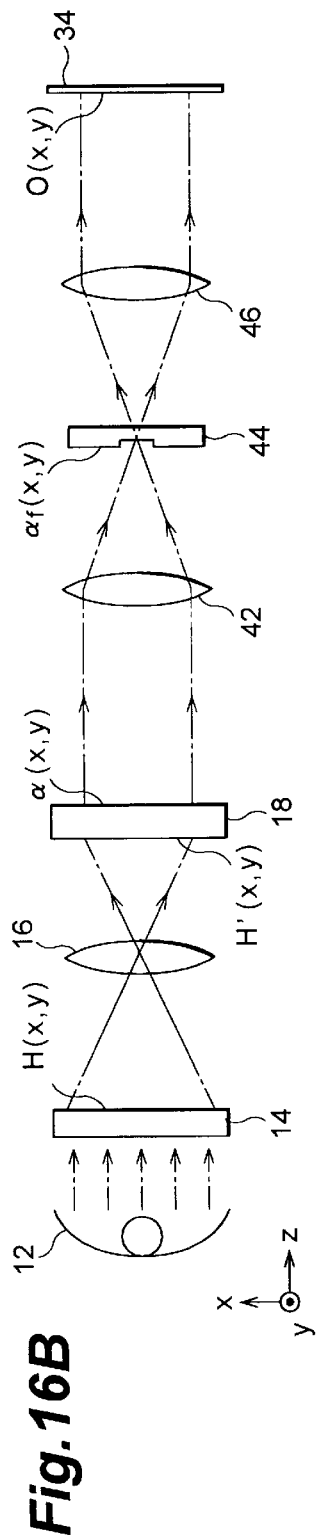
Fig. 16A
Fig. 16B

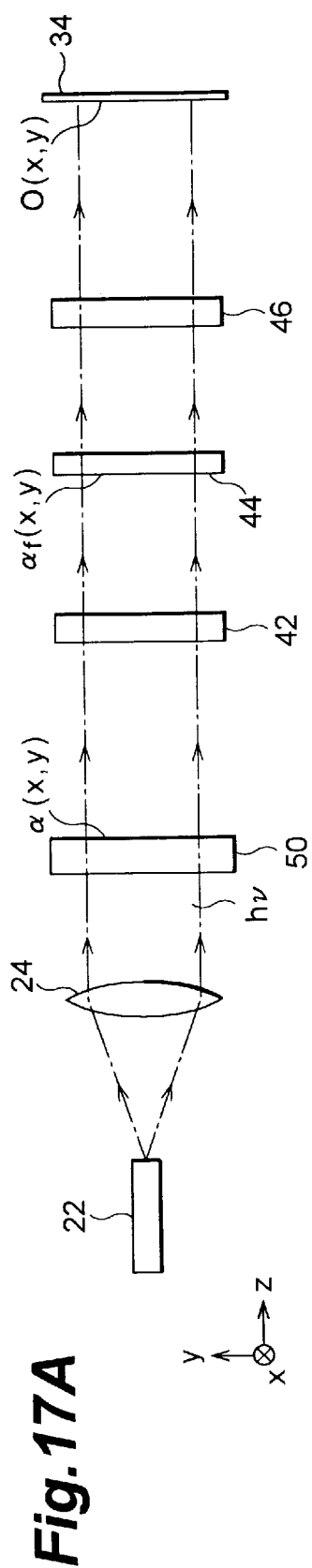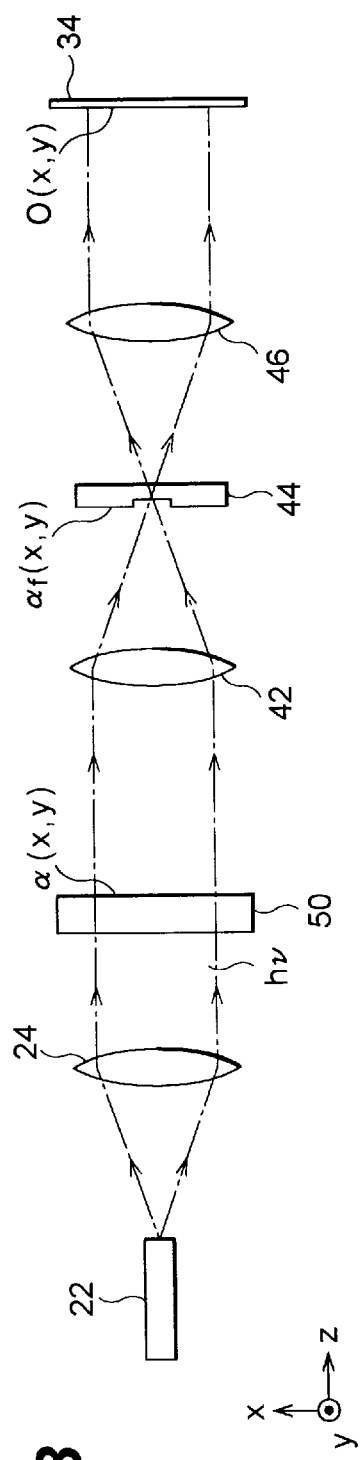

IMAGE FORMING APPARATUS

BACKGROUND OF THE INVENTION

1. Field of the Invention

The present invention relates to an image forming apparatus for forming an optical image, based on electrical image information. More particularly, the invention concerns an image forming apparatus for forming a desired image at high light utilization efficiency by using a coded phase image as an input image and giving a phase shift to a Fourier light image of the coded phase image.

2. Related Background Art

A conventionally known method for microscopic observation of an object having differences of phase is the so-called Zernike phase contrast method for emphasizing the small differences of phase in microscopy and proposals to extend this method to the field of image display and the like are made in References 1 to 3 below by Jesper Glückstad.

Reference 1; "Generalized Phase Contrast Imaging," Patent Application WO 96/34307 (Oct. 31, 1996)

Reference 2; "Adaptive array illumination and structured light generated by spatial zero-order modulation in a Kerr medium," Optics Communications 120 (1995) pp. 194–203

Reference 3; "Phase contrast image synthesis," Optics Communications 130 (1996) pp. 225–230

For example, as disclosed in Reference 3, the input image is coded into a phase-modulated light image by a phase modulation type spatial light modulator and the phase-modulated light image is displayed thereon and then is guided through a 4f lens configuration to form an output image on an output plane. At this time, a phase contrast filter is placed on the Fourier plane of the 4 f lens configuration to shift the phase of the zero-order light component on the Fourier plane, thereby converting the input image to the output image (as will be referred to as a target image) of desired intensity.

Use of this phase shift image display (formation) method makes it theoretically possible to form the output image of desired intensity at the light utilization efficiency of 100%. Therefore, much higher light utilization efficiency is achieved, when compared with the light utilization efficiency of about 20% in the case of a normal liquid-crystal television using a polarizing plate as a display panel screen.

An example of the phase modulation type spatial light modulator known is a Parallel Aligned Liquid-crystal Spatial Light Modulator (PALSLM) as described in Reference 4; Tsutomu Hara, "Spatial light modulator and optical analog arithmetics," OplusE, Special Issue: Optoelectronic image processing technology, March 1995, No. 184, pp. 101–108, published by Shin Gijyutsu Communications Kabushiki Kaisha. This Reference 4 reports an example to modify the PALSLM, originally, of an optical address type to that of an electrical address type by combination with a display screen of CRT. With this modified phase modulation type spatial light modulator, a desired input image is displayed on the CRT and the input image is guided to the PALSLM, thereby enabling application of computer system.

Further, Reference 5; Hiroshi Imai et al., "Circular polarization phase modulation characteristics of TN liquid-crystal panel," Optics Vol. 21, No. 8 (August 1992) pp. 42–46, presents a proposal to utilize a cheap liquid-crystal television of high resolution as a phase modulation type spatial light modulator. This proposal also enables introduction of computer system, because a desired input image can be displayed on the liquid-crystal television.

The above-stated proposals in References 1 to 3 can achieve desired results, if various characteristics of optical system are ideal. In practice, however, there exists noise, for example, resulting from nonuniformity of laser light, MTF of optical system, nonuniformity of spatial light modulator, degradation of accuracy of phase contrast filter, temperature characteristics of each optical element, and so on. This noise sometimes made nonuniform the contrast of the output image obtained by the real optical system, different from the ideal state.

In applications of the spatial light modulator of combination of CRT with PALSLM in aforementioned Reference 4, image distortion of CRT is normally about 3%, which would be a serious problem in uses not permitting this distortion, for example, in computer graphic holography (CGH) technology, high-precision laser processing technology, optical filtering technology, optical modulation technology for separately controlling the phase and the amplitude of light, and use of stack of plural spatial light modulators.

In applications of the liquid-crystal television in aforementioned Reference 5, since the liquid-crystal television has the pixel structure, the maximum aperture ratio thereof is 50% or so and optical diffraction takes place at edges of pixel driving electrode thereof, posing a problem of large optical loss. For example, as shown in FIG. 24A, laser light emitted from laser light source 2 is expanded into parallel light by collimator lens 4 to irradiate liquid-crystal television 6, and image light displayed on the liquid-crystal television 6 is focused by Fourier lens 8 to form an image on screen 10 placed at the position of the focal point of the Fourier lens 8. Then, convolution noise due to diffraction at each pixel of liquid-crystal television appears on the screen 10, as shown in FIG. 24B. The intensity of the zero-order light component (the Fourier image appearing at the optic center) is reduced to a fraction, because of appearance of diffraction images around it. Therefore, there arises a problem that an image obtained by inverse Fourier transform of the zero-order light component is of low luminance and becomes unsharp.

The present invention has been accomplished in view of the problems in the conventional technology as described and an object of the present invention is to provide an image forming apparatus for forming a sharp image at high light utilization efficiency.

SUMMARY OF THE INVENTION

For achieving the above objective, the present invention provides an image forming apparatus for forming an optical image, based on electrical image information, comprising: an operation optical system having at least (1) a display device of a light transmission type for, based on the electrical image information, displaying a two-dimensional input image corresponding thereto, (2) an illumination device for radiating illumination light to the display image of the display device, (3) read light generating means for emitting coherent read light, (4) a two-dimensional spatial light modulator of an optical address type irradiated by a two-dimensional intensity light image formed in accordance with the two-dimensional input image by the illumination light transmitted by the display device, said spatial light modulator phase-modulating the read light radiated from the read light generating means according to a spatial light intensity distribution of the two-dimensional intensity light image to output a two-dimensional phase-modulated light image having a spatial light intensity distribution, (5) a Fourier lens for converting the phase-modulated light image to a Fourier light image, (6) a phase contrast filter, disposed on a Fourier plane of the Fourier lens, for phase-shifting a zero-order light component of the Fourier light image, and (7) an inverse Fourier lens for undergoing inverse Fourier transform of the Fourier light image to output the optical image; and operation controlling means for applying a desired ideal image to be formed as the optical image to a theoretical characteristic of the operation optical system, thereby reversely calculating the electrical image information.

Another image forming apparatus of the present invention may be constructed in such a way that (1) and (2) described above are replaced by a self-emission type display device for, based on the electrical image information, radiating a two-dimensional intensity image corresponding thereto and that this two-dimensional intensity image is radiated to the two-dimensional spatial light modulator of the optical address type.

Another image forming apparatus of the present invention may be constructed in such a way that (1) and (2) described above are excluded and that the optical address type two-dimensional spatial light modulator of (4) is replaced by a two-dimensional spatial light modulator of the electrical address type for phase-modulating the read light according to the electrical image information to output the two-dimensional phase-modulated light image having the spatial light intensity distribution.

In this case, the two-dimensional spatial light modulator is preferably a liquid-crystal display panel.

Still another apparatus may be constructed in such an arrangement that the Fourier lens is a first lens for one-dimensional Fourier transform, the inverse Fourier lens is a second lens for one-dimensional inverse Fourier transform, and a Fourier transform plane of the first lens and an inverse Fourier transform plane of the second lens are arranged in a same orientation.

The phase contrast filter used in the present invention may be so structured that a dielectric multilayer film having a predetermined light transmittance is interposed between a light modulating material layer biased at a predetermined voltage and a photoconductor layer, the Fourier light image is made incident to the light modulating material layer and is reflected by the dielectric multilayer film to be outputted, an electrical characteristic of the photoconductor layer is changed by a part of the zero-order light component of the Fourier light image transmitted by the dielectric multilayer film, thereby changing a birefringence distribution in the light modulating material layer, and the light modulating material layer phase-shifts the Fourier light image reflected by the dielectric multilayer film to output the phase-shifted light image.

The operation controlling means used in the present invention may comprise evaluation value calculating means for observing the optical image outputted from the inverse Fourier lens and evaluating conformity of the optical image with the desired ideal image, and variable control means for variably controlling an optical characteristic of the operation optical system, based on the evaluation result of the evaluation value calculating means.

According to the above arrangements, the two-dimensional spatial light modulator forms the phase-modulated light image corresponding to the electrical image information. This phase-modulated light image is converted to the Fourier light image and the phase contrast filter shifts the phase of the zero-order light component thereof. The Fourier light image thus phase-shifted is then subjected to the inverse Fourier transform to form an optical image of real image, which is outputted. Therefore, the clear optical image with high contrast can be formed at high light utilization efficiency.

In the arrangement wherein the Fourier lens is the first lens for one-dimensional Fourier transform and the inverse Fourier lens is the second lens for one-dimensional inverse Fourier transform, the Fourier light image is generated by one-dimensional Fourier transform of the phase-modulated light image, the phase of the zero-order light component of this Fourier light image is shifted, and thereafter it is converted to the optical image of real image by one-dimensional inverse Fourier transform. This can prevent light of high energy from being concentrated at a point on the phase contrast filter. This can prevent damage of the phase contrast filter, in turn realizing the image forming apparatus using the high energy light.

With use of the phase contrast filter having the light modulating material layer, the photoconductor layer, and the dielectric multilayer film, the phase shift is automatically carried out according to the light intensity of the zero-order light component of the Fourier light image. This obviates a need for optical fine adjustment, thereby providing the image forming apparatus with general versatility capable of forming further various images.

By variable control of characteristic of the operation optical system by the operation controlling means, deviation characteristics from the ideal condition of the operation optical system and optical loss can be compensated for. This achieves the excellent effect that the optical image matching the desired ideal image can be formed.

This image forming apparatus demonstrates the excellent effect, when applied to the CGH technology, the optical filtering technology, the optical modulation technology for separately controlling the phase and the amplitude of light, the use of stack of plural spatial light modulators, and so on.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 8A and 8B are a side view and a top plan view, respectively, of the embodiment of FIG. 7, viewed in the x-coordinate direction and in the y-coordinate direction;

FIGS. 11A–11C are explanatory drawings to show the structure of another phase contrast filter in the second embodiment of FIG. 7, wherein FIGS. 11A and 11B are cross-sectional views thereof, viewed in the y-coordinate direction and in the x-coordinate direction, respectively, and FIG. 11C is a perspective view to show the positional relation of its major components;

FIGS. 12A–12C are explanatory drawings to show the structure of still another phase contrast filter in the second embodiment of FIG. 7, wherein FIGS. 12A and 12B are cross-sectional views thereof, viewed in the y-coordinate direction and in the x-coordinate direction, respectively, and FIG. 12C is a perspective view to show the positional relation of its major components;

FIGS. 14A and 14B are block diagrams to show the configuration of a modification of the second embodiment of FIG. 7, wherein FIGS. 14A and 14B are a side view and a top plan view thereof viewed in the x-coordinate direction and in the y-coordinate direction, respectively;

FIGS. 15A and 15B are block diagrams to show the configuration of another modification of the second embodiment of FIG. 7, wherein FIGS. 15A and 15B are a side view and a top plan view thereof viewed in the x-coordinate direction and in the y-coordinate direction, respectively;

FIGS. 16A and 16B are block diagrams to show the configuration of still another modification of the second embodiment of FIG. 7, wherein FIGS. 16A and 16B are a side view and a top plan view thereof viewed in the x-coordinate direction and in the y-coordinate direction, respectively;

FIGS. 17A and 17B are block diagrams to show the configuration of the third embodiment of the present invention, wherein FIGS. 17A and 17B are a side view and a top plan view thereof viewed in the x-coordinate direction and in the y-coordinate direction, respectively;

DESCRIPTION OF THE PREFERRED EMBODIMENTS

Figure 1:
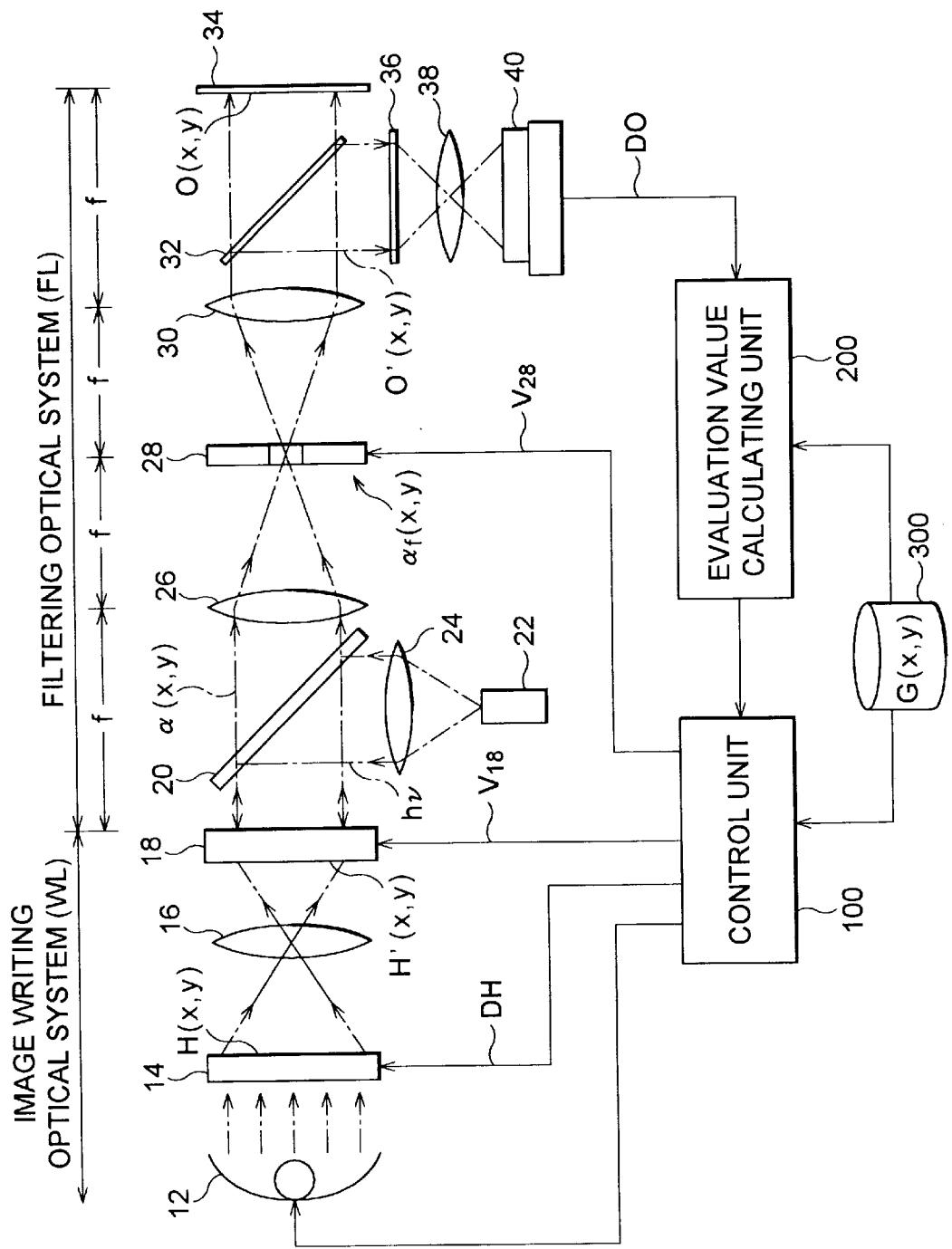
FIG. 1 is a block diagram to show the configuration of the first embodiment according to the present invention.

The preferred embodiments of the present invention will be described with reference to the accompanying drawings. In the drawings, same components will be denoted by same reference numerals as much as possible, and redundant description will be omitted.

(First Embodiment)

First, the first embodiment of the present invention will be described.

In the block diagram of FIG. 1, the image forming apparatus comprises an analog operation optical system for carrying out optical analog operation and an electric control system for electrically controlling this optical system. The optical analog operation optical system has an image writing optical system WL and a filtering optical system FL optical axes of which are aligned with each other. The electric control system comprises a control unit 100 for carrying out a control process described below by executing a program produced based on a preliminarily determined algorithm, an evaluation value calculating unit 200 for carrying out an evaluation calculation process, and a memory section 300 consisting of a hard disk or the like.

The image writing optical system WL comprises an illumination light source 12, a light transmission type liquid-crystal display panel 14, an imaging lens 16, and a two-dimensional spatial light modulator 18. The two-dimensional spatial light modulator 18 is a reflection type parallel aligned liquid-crystal spatial light modulator (hereinafter referred to as PALSLM 18).

The illumination light source 12 radiates illumination light of white light or the like with no peak at a specific wavelength in the visible light region and with uniform illuminance to the liquid-crystal display panel 14.

The display panel 14 displays an input image H(x, y) for projection of an output image O(x, y) to the output plane 34, according to image data DH supplied from the control unit 100. Here, each of the output image O(x, y) and the input image H(x, y) indicates a two-dimensional spatial distribution of output image intensity or input image intensity, respectively, on coordinates (x, y). Other images and light images will be represented in the same manner. The illumination light from the illumination light source 12 is made to pass through the display panel 14, whereby two-dimensional intensity light image H'(x, y), which is a transmitted light image of the input image H(x, y), is focused on the PALSLM 18 through the imaging lens 16.

Figure 2:
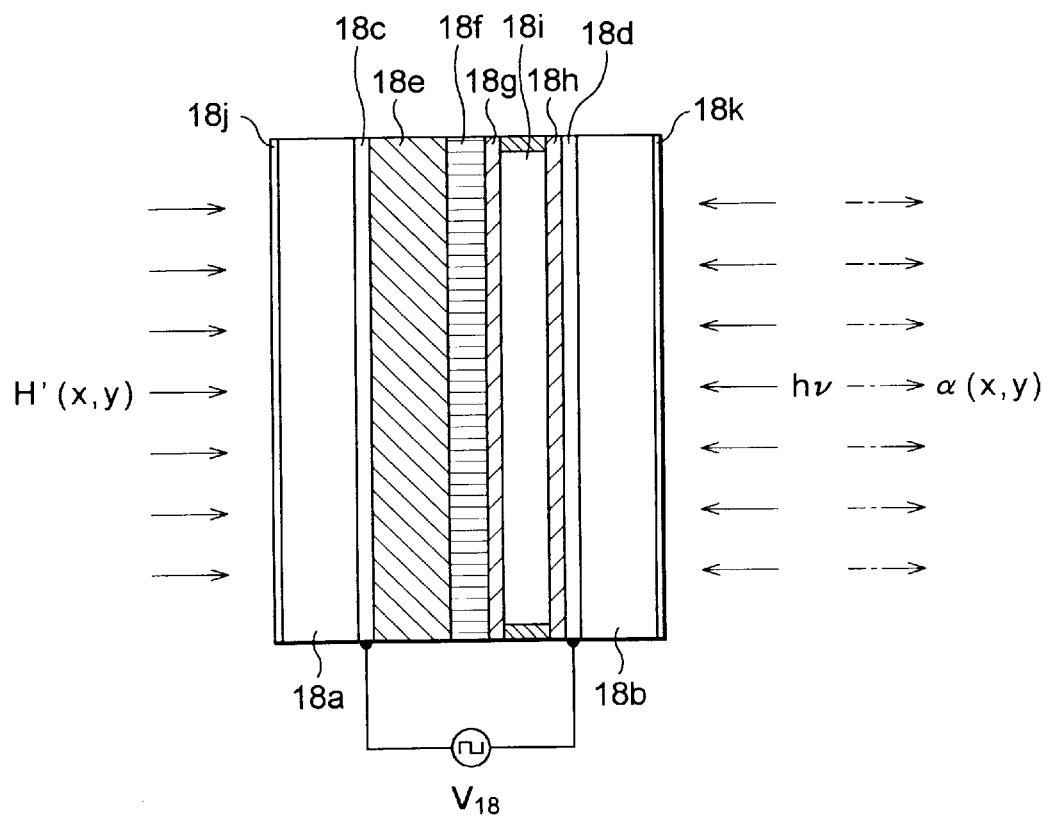
FIG. 2 is a longitudinal, cross-sectional view to schematically show the structure of the parallel aligned liquid-crystal light modulator used in the embodiment of FIG. 1.

The PALSLM 18 is structured as schematically shown in the longitudinal, cross-sectional view of FIG. 2. Specifically, it has the sandwich structure wherein a photoconductor layer 18e, a dielectric multilayer film mirror 18f, and a light modulating material layer 18i interposed between orientational layers 18g, 18h are disposed between transparent, conductive films (ITO) 18c, 18d deposited on the inside of transparent glass substrates 18a, 18b placed in parallel. Further, nonreflective coat 18j, 18k is provided on an outside surface of transparent glass substrate 18a, 18b. The photoconductor layer 18e is made, for example, of hydrogenated amorphous silicon (a-Si:H) and the light modulating material layer 18i is made, for example, of a material such as a parallel alignment type nematic liquid crystal.

The control unit 100 applies ac driving voltage $V_{18}$ between the transparent, conductive films 18c, 18d and the aforementioned, two-dimensional intensity light image H'(x, y) is incident to the transparent glass substrate 18a. Two-dimensional distribution of internal impedance of the photoconductor layer 18e changes according to light intensity of this two-dimensional intensity light image H'(x, y) and distribution of field intensity on the light modulating material layer 18i changes with the change of impedance. This will result in changing orientation of liquid crystal in the light modulating material layer 18i according to this field intensity distribution. Here, variably controlling the voltage level of ac driving voltage $V_{18}$ makes it possible to adjust reception sensitivity of two-dimensional intensity light image H'(x, y), i.e., to adjust a change amount of orientation of liquid crystal in the light modulating material layer 18i according to the two-dimensional intensity light image H'(x, y).

In a state wherein the orientation of light modulating material layer 18i is changed, the coherent read light hv is radiated to the back surface of PALSLM 18, i.e., to the transparent glass substrate 18b. This read light hv is made by enlarging the laser light emitted from the laser light source 22 into uniform parallel light by the collimator lens 24 and is arranged to be reflected by the beam splitter 20 to irradiate the back surface of PALSLM 18.

Then the read light hv is modulated in phase by the light modulating material layer 18i of PALSLM 18 and then is reflected by the dielectric multilayer film mirror 18f. Then the read light again passes through the light modulating material layer 18i to be again modulated in phase. The read light is then outputted from the transparent glass substrate 18b, which was the incident plane. This output light contains phase-modulated light image α(x, y) and the beam splitter 20 transmits only this phase-modulated light image α(x, y) to guide it to the Fourier lens 26. Since the PALSLM 18 undergoes the two-dimensional phase modulation of the read light hv without possession of the pixel structure, it converts the read light hv to the phase-modulated light image α(x, y) without loss.

Letting φ(x, y) be phase components after the phase modulation by the light modulating material layer 18i, the phase-modulated light image α(x, y) can be expressed theoretically by complex Eq. (1) below.

$$\alpha(x,y) = exp(i\phi(x,y)) \tag{1}$$

Let us define characteristic function $F_2$ as input/output characteristics of PALSLM 18, i.e., as output characteristics of the phase-modulated light image α(x, y) with incidence of the two-dimensional intensity light image H'(x, y) and $F_1$ as a characteristic function of the optical system for converting the input image H(x, y) displayed on the liquid-crystal display panel 14 to the two-dimensional intensity light image H'(x, y). Then the phase-modulated light image is expressed as follows.

$$\alpha(x, y) = F_2[H'(x, y)] \tag{2}$$
$$= F_2\{F_1[H(x, y)]\}$$

These characteristic functions $F_1$, $F_2$ can be preliminarily known empirically or theoretically.

The filtering optical system FL has the Fourier lens 26 and inverse Fourier lens 30 both having the focal length f and is constructed in such an arrangement that the aforementioned light modulating material layer 18i of PALSLM 18 is positioned at the position of the front focal point of the Fourier lens 26, the phase contrast filter 28 is placed at the position of the rear focal point of Fourier lens 26 (hereinafter referred to as the Fourier plane), and the output plane 34 is located at the position of the rear focal point of the inverse Fourier lens 30, thus composing a 4 f optical system. Further, the aforementioned beam splitter 20 is located between the PALSLM 18 and the Fourier lens 26 and beam sampler 32 between the inverse Fourier lens 30 and the output plane 34.

Figure 3A:
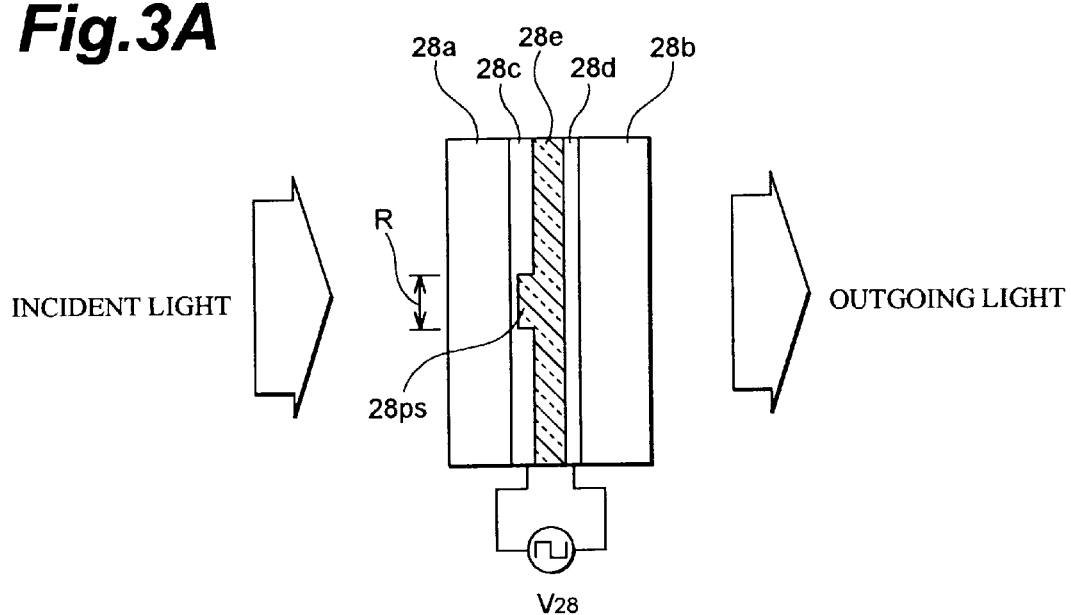
FIGS. 3A to 3C are longitudinal, cross-sectional views to schematically show structures of phase contrast filters used in the embodiment of FIG. 1.

The phase contrast filter 28 is structured as schematically shown in the longitudinal, cross-sectional view of FIG. 3A. Specifically, transparent electrode material layers (ITO) 28c, 28d are provided adjacent to each other on internal wall faces of transparent glass substrates 28a, 28b arranged in parallel. Liquid crystal layer 28e is sandwiched between the transparent electrode material layers 28c, 28d. Then the light incident to the transparent glass substrate 28a changes an amount of its phase shift taking place during passage through the liquid crystal layer 28e, according to voltage level and frequency of ac driving voltage $V_{28}$ applied between the transparent electrode material layers 28c, 28d from the control unit 100.

Provided in the central portion of the liquid crystal layer 28e is a circular projection region 28ps of the diameter R to which the zero-order light component of the Fourier light image $\alpha_f$(x, y) is incident (the incident region of the zero-order light component will be called a phase shift region), and the other part of the liquid crystal layer 28e is made in a uniform thickness.

The diameter R of this phase shift region 28ps is defined by R=fλ/D, where λ is the wavelength of the read light hv, f is the focal length of Fourier lens 26, and D is the expanded beam diameter before the first Fourier lens. The phase shift region 28ps is made in such a manner that the transparent electrode material layers 28c, 28d are first made in the uniform thickness on the transparent glass substrates 28a, 28b, a circular recess of the diameter R is made by etching, laser processing, or the like in the central portion of the transparent electrode material layer 28c, and thereafter the liquid crystal layer 28e is placed between the transparent electrode material layers 28c, 28d.

Since the phase shift region 28ps and the rest part of this liquid crystal layer 28e have mutually different thicknesses in the optic-axis direction, field intensities by the ac driving voltage $V_{28}$ are different from each other, so that they each give different phase shifts to the zero-order light component and higher-order light components of the Fourier light image $\alpha_f$(x, y). The phase shift amounts θ can be variably adjusted within the range of 0 to 2π, mainly, by changing the voltage level of ac driving voltage $V_{28}$.

Theoretically, the phase shift of phase shift region 28ps, T(r), is given as follows.

$$T(r) = 1 + [exp(i\Theta) - 1]circ\left(\frac{r}{\Delta r}\right) \tag{3}$$

In the equation, θ is the phase shift amount and Δr is a radius of the phase shift region 28ps.

Then the Fourier lens 26 undergoes the Fourier transform of the phase-modulated light image α(x, y) expressed by above Eq. (1), the phase contrast filter 28 gives the phase shift T(r) of above Eq. (3) to the zero-order light component of the Fourier light image $\alpha_f$(x, y), and the inverse Fourier lens 30 further changes the phase-shifted spectrum light image back to the output image of real image O(x, y) to project it onto the output plane 34.

The beam sampler 32 is, for example, a light splitting element of 99:1. The beam sampler 32 projects 99% of the light image from the inverse Fourier lens 30 as an output image O(x, y) to the output plane 34 and also projects 1% as branched light image O'(x, y) to a translucent screen 36. The translucent screen 36 is disposed at the position of the rear focal point of the inverse Fourier lens 30 to transmit the branched light image O'(x, y) as changing it to an optical image without phase component.

This optical image without phase component is picked up by imaging lens 38 and two-dimensional solid state image sensor 40 disposed behind the translucent screen 36, and image data DO obtained is outputted to the evaluation value calculating unit 200.

The intensity distribution I(x, y) of the output image O(x, y) is theoretically obtained by fourier transforming of a phase shifted image which is a multiplication image of the phase contrast filter (Eq. (3)) and the fourier transformed image of the input image (Eq. (1)), which is given as follows.

$$I(x, y) = 1 + 4|\bar{\alpha}|\sin\left(\frac{\Theta}{2}\right)\left[|\bar{\alpha}|\sin\left(\frac{\Theta}{2}\right) - \sin\left(\phi_{\bar{\alpha}} - \phi(x, y) + \frac{\Theta}{2}\right)\right] \quad (4)$$

Here, $\bar{\alpha} = |\bar{\alpha}|\exp(i\phi_{-\alpha})$ represents a complex mean value of the phase-modulated light image α(x, y).

In Eq. (4), it is theoretically apparent that conditions for making the output image O(x, y) with clear contrast are that the luminance of portions $(x_0, y_o)$ to be dark should satisfy $I(x_o, y_0)=0$ and that the absolute value of the complex mean value should be within the range of $0<|\bar{\alpha}|<1$. Introducing these conditions to aforementioned Eq. (4), the relation is derived between phase shift amount θ and complex mean value $\bar{\alpha}$, thereby obtaining Eqs. (5) and (6) below.

$$|\bar{\alpha}| = \left\{2\left|\sin\left(\frac{\Theta}{2}\right)\right|\right\}^{-1} \quad (5)$$

$$0.5 < |\bar{\alpha}| < 1.0 \quad (6)$$

Thus, in the control unit 100 detailed below, when a desired target image G(x, y) intended to be projected to the output plane 34 is determined, the control unit 100 applies the luminance I(x, y) of this target image G(x, y) to above Eq. (4) to reversely calculate the phase-modulated light image α(x, y), it obtains a luminance mean value of white level portions and black level portions of the phase-modulated light image α(x, y) (in other words, the complex mean value $\bar{\alpha}$), and the control unit puts it into above Eq. (5) to determine the phase shift amount θ of the phase shift region 28ps.

Further, the phase-modulated light image α(x, y) is put into above Eq. (2) to reversely calculate the input image H(x, y) corresponding to the target image G(x, y) and the input image is displayed on the liquid crystal display panel 14.

Accordingly, the control unit 100 theoretically calculates and displays the input image H(x, y) as a basis for projection of the desired target image G(x, y), assuming that the image writing optical system WL and the filtering optical system FL are ideal optical systems without any characteristic distortion at all. Data of the target image G(x, y) to be projected is preliminarily stored in the memory section 300, the control unit 100 reads the data of target image G(x, y) out thereof, the control unit obtains the image data DH by the aforementioned operation process, and this image data DH is supplied to the liquid crystal display panel 14, thereby displaying the input image H(x, y) thereon.

The evaluation value calculating unit 200 evaluates a difference between the output image O(x, y) actually projected onto the output plane 34 and the ideal target image G(x, y) and makes the control unit 100 perform feedback control of optical elements of the image writing optical system WL and the filtering optical system FL so as to match the output image O(x, y) with the target image G(x, y).

Specifically, the evaluation value calculating unit 200 calculates the sum, $\epsilon=\Sigma(O'(x, y)-G(x, y))$, of differences between the image data DO of the branched light image O'(x, y) outputted from the two-dimensional solid state image sensor 40 and the image data of the target image G(x, y) for the respective pixels. The evaluation value calculating unit 200 determines an evaluation value indicating better agreement of the output image O(x, y) with the ideal target image G(x, y) for smaller ε of this sum of differences and transfers the evaluation value to the control unit 100.

Using this value as a control parameter, the control unit 100 performs adjustment of intensity of the illumination light by controlling the driving power supplied to the illumination light source 12, adjustment of brightness (light transmittance) of liquid crystal display panel 14 by controlling the voltage level and frequency of the ac driving voltage to the liquid crystal display panel 14, adjustment of phase modulation amount of PALSLM 18 by controlling the voltage value and frequency of the ac driving voltage $V_{18}$ supplied to the PALSLM 18, and adjustment of the phase shift amount θ by controlling the voltage level and frequency of the ac voltage $V_{28}$ supplied to the phase contrast filter 28.

Then the control unit 100 and evaluation value calculating unit 200 perform such feedback control as to maximize the evaluation value (in other words, as to minimize the difference sum ε) by the so-called hill climbing learning method or the like. Based thereon, feedback control is made so as to automatically compensate for the characteristic distortion of the optical elements of the image writing optical system WL and filtering optical system FL and thereby make the real output image O(x, y) projected on the output plane 34 match the desired target image G(x, y).

Figure 4:
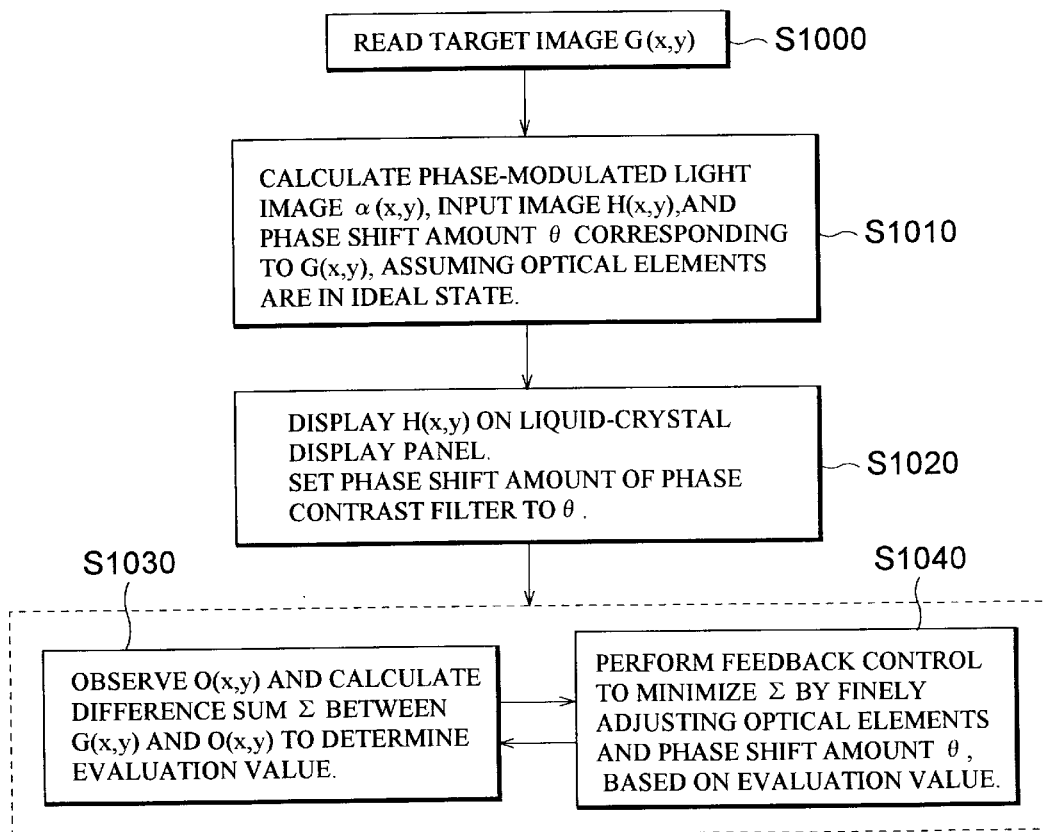
FIG. 4 is a flowchart for explaining the operation of the embodiment of FIG. 1.

The operation of the image forming apparatus having the above configuration will be described referring to the flowchart of FIG. 4. When an operator gives an instruction designating a desired target image G(x, y) to the control unit 100, the control unit reads data of the target image G(x, y) out of the memory section 300 at step S1000. Next, at step S1010, the control unit calculates, based on above-stated Eqs. (1) to (6), the image data DH of the input image H(x, y) and the phase shift amount θ of the phase shift region 28ps of the phase contrast filter 28, as assuming that the target image G(x, y) is projected to the output plane 34 with the optical elements being in the ideal state.

Next, at step S1020, the input image H(x, y) is displayed on the liquid crystal display panel 14 and the phase shift amount θ of the phase shift region 28ps is set by the ac driving voltage $V_{28}$. This causes the real output image O(x, y) corresponding to the ideal input image H(x, y) where the optical elements are assumed to be in the ideal state, to be projected to the output plane 34.

Let us consider a specific example. The dynamic range of the input image H(x, y) is maximum when the complex mean value $\bar{\alpha}$ of the phase-modulated light image α(x, y) of PALSLM 18 is 0.5. Thus, when $\bar{\alpha}=0.5$ is substituted into Eq. (5), the phase shift amount θ=π. At this time, supposing that the ideal target image G(x, y) is projected to the output plane 34, the relation of the phase-modulated light image α(x, y) with luminance I(x, y) of the target image G(x, y) is expressed as follows from above Eq. (3).

$$I(x,y)=2[1-\cos(\phi(x,y))] \quad (7)$$

Further, for the phase-modulated light image α(x, y) at $\bar{\alpha}=0.5$, the following relations hold.

$$\iint_{\Delta x \Delta y} \backslash(\backslash\%\backslash)\cos(\phi(x, y))dx dy = \bar{\alpha}\Delta x \Delta y \quad (8)$$
$$= 0.5\Delta x \Delta y$$

$$\iint_{\Delta x \Delta y} \backslash(\backslash\%\backslash)\sin(\phi(x, y))dx dy = 0 \quad (9)$$

Wherein Δx and Δy denote the active area size of the input image. Eq. (8) indicates the real part of the phase-modulated light image φ(x, y) and Eq. (9) the imaginary part thereof.

Thus, the input image H(x, y) corresponding to the target image G(x, y) is obtained by the operations of above Eqs. (7) to (9) and the phase shift amount of the phase contrast filter 28 is set to be θ=π so as to obtain the maximum dynamic range.

Then step S1030 is carried out to observe and pick up the output image O(x, y) actually projected corresponding to the input image H(x, y), by means of the two-dimensional solid state image sensor 40 and then to transfer the image data DO obtained to the evaluation value calculating unit 200. The evaluation value calculating unit 200 calculates the difference sum e between the image data DO and the data of the target image G(x, y) to evaluate deviation of the output image O(x, y) from the ideal and to transfer the evaluation value to the control unit 100.

Then, at step S1040, the control unit 100 automatically finely adjusts, based on this evaluation value, the illuminance of the illumination light of illumination light source 12, the brightness of the liquid crystal display panel 14, the input/output characteristics of PALSLM 18, and the phase shift amount θ of the phase contrast filter 28. Then the feedback control is made to repeat the processes of steps S1030 and S1040 so as to maximize the evaluation value by the so-called hill climbing method. This gradually compensates for the deviation from the ideal state of each optical element of the operation optical system, whereby the output image O(x, y) can be matched with the desired target image G(x, y).

Figure 5:
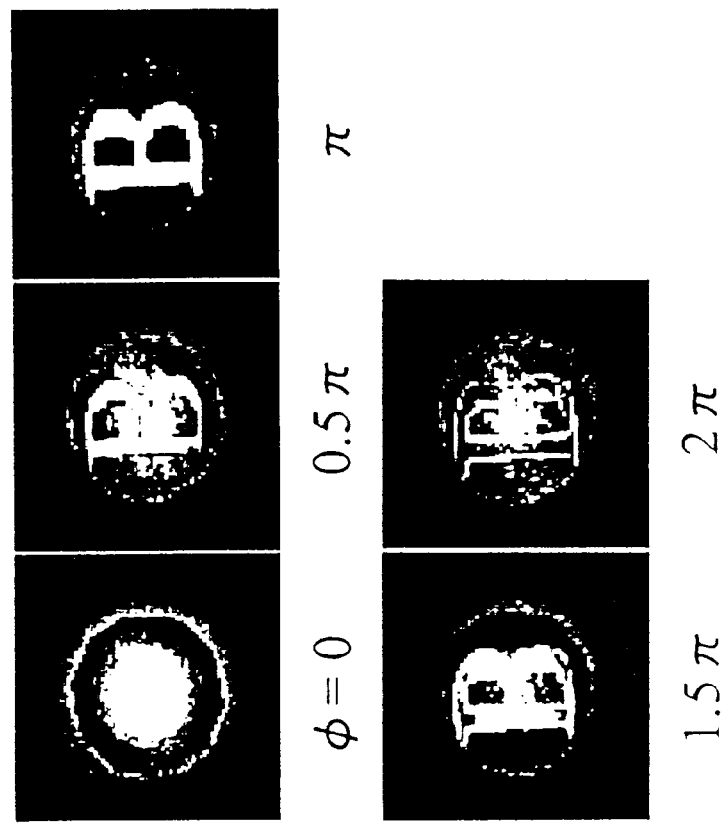
FIG. 5 is a drawing to show results of experiment for checking the characteristics of the embodiment of FIG. 1, showing various halftone images obtained by photographing output images.

FIG. 5 shows results of experiment obtained by photographing output images O(x, y) with setting the phase shift amount θ=π and changing the phase modulation amount ρ of the phase-modulated light image of "B" appearing on the PALSLM 18 in this image forming apparatus. More specifically, the output images O(x, y) were photographed in time series while the brightness of the liquid crystal display unit 14 was under the feedback control by the control unit 100 and evaluation value calculating unit 200. The sharpest output image O(x, y) was obtained when the phase modulation amount ρ is π.

The above experimental results empirically confirmed that the output image O(x, y) was able to be formed in agreement with the desired target image G(x, y), with less noise component, and with high luminance and high contrast.

Figure 3B:
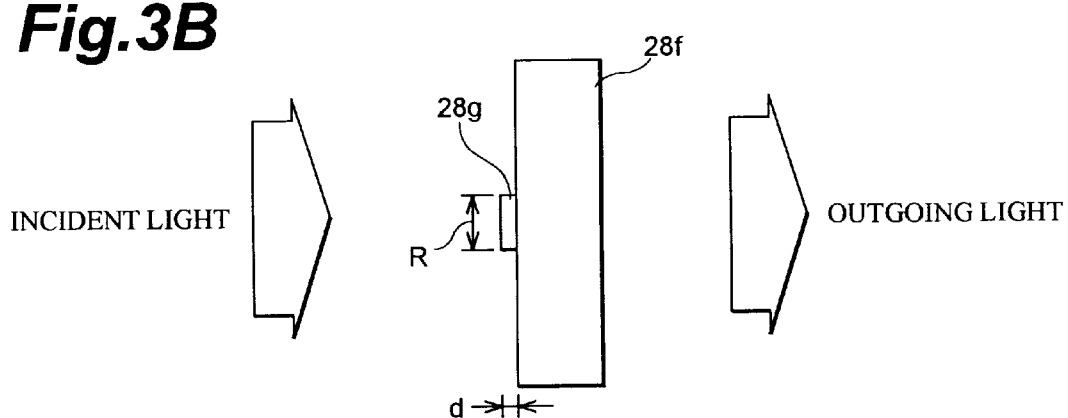
Figure 3C:
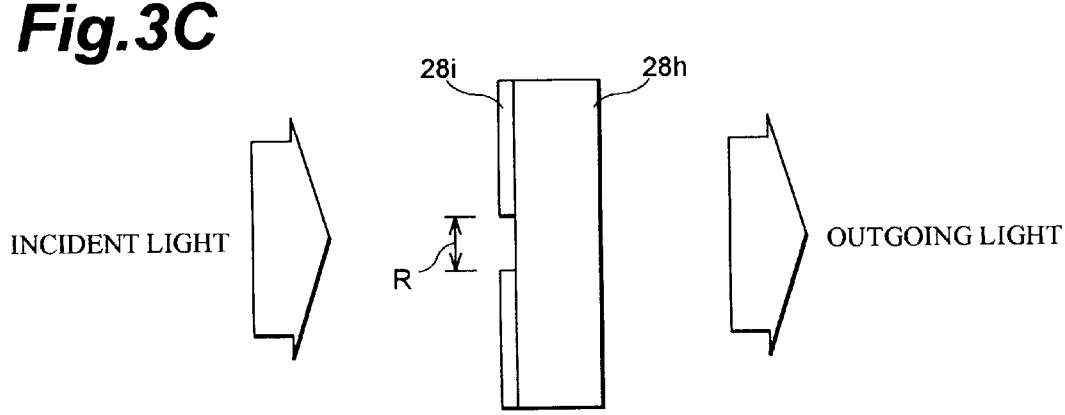

The above description concerned the example using the phase contrast filter 28 capable of variably controlling the phase shift amount θ, but, in applications wherein the phase shift amount e may be fixed, a fixed type phase contrast filter for fixing the phase shift amount θ at π for the zero-order light component of the Fourier light image $α_f(x, y)$ may be applied, as shown in FIG. 3B or 3C.

In the phase contrast filter of FIG. 3B, a dielectric material layer 28g of a projected shape equal to the beam diameter R of the zero-order light component is formed in a predetermined thickness d on the light incidence plane of the transparent glass substrate 28f. The phase contrast filter is so structured as to shift the phase of the zero-order light component transmitted by the dielectric material layer 28g by π.

The phase contrast filter of FIG. 3C is so structured that a dielectric material layer 28i of a predetermined thickness is made in a peripheral portion except for the portion where the zero-order light component passes, on the transparent glass substrate 28h, thereby shifting the phase of the zero-order light component by π.

Figure 6:
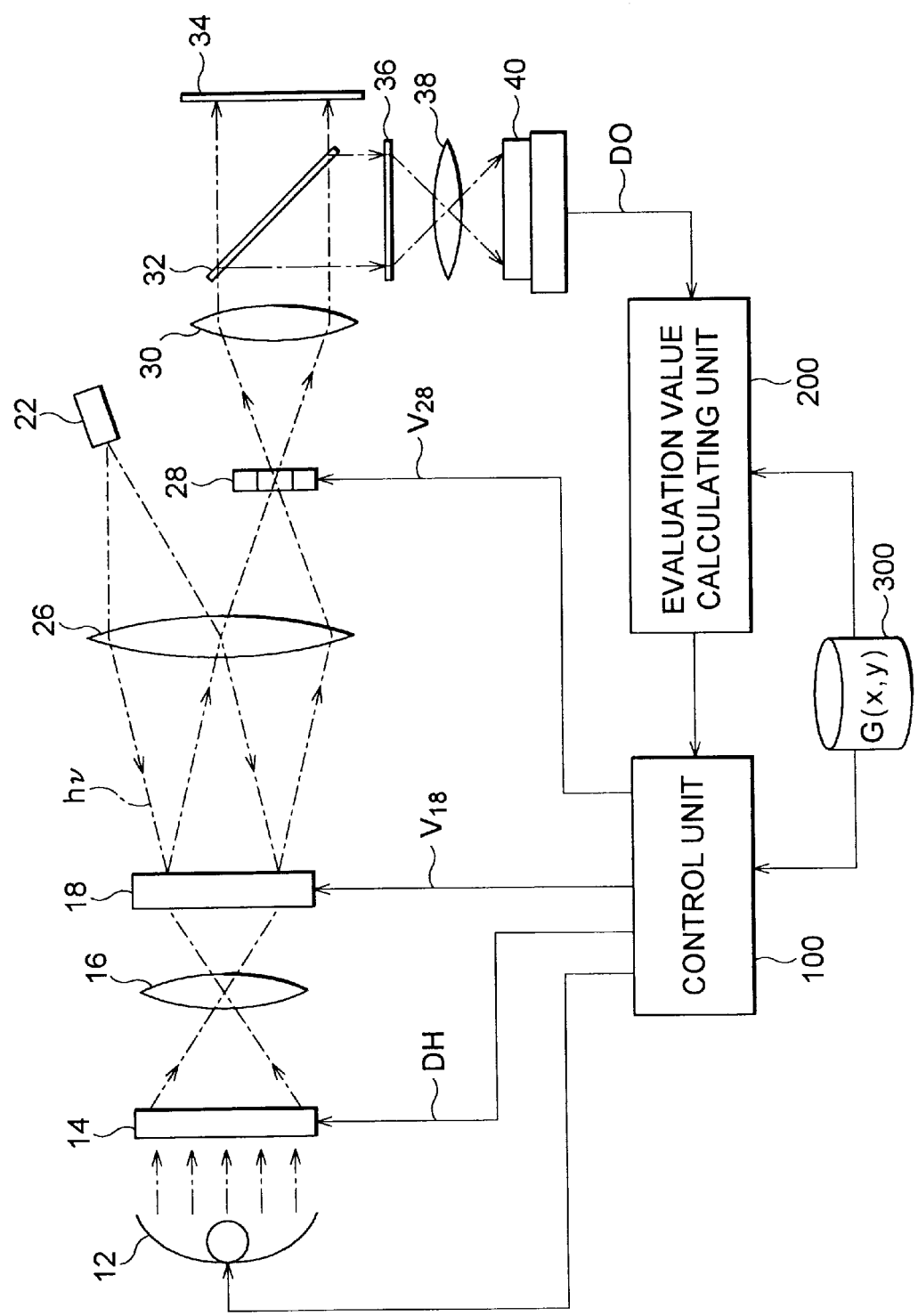
FIG. 6 is a block diagram to show the configuration of a modification of the embodiment of FIG. 1.

The operation optical system shown in FIG. 1 achieved the incidence of read light hv and the transmission of phase-modulated light image α(x, y) to the Fourier lens 26 by providing the beam splitter 20 between the PALSLM 18 and the Fourier lens 26, but the operation optical system may be configured without this beam splitter 20, as shown in FIG. 6.

In the configuration of FIG. 6, the laser light emitted from the laser light source 22 is converted to parallel light (read light) by one end part of Fourier lens 26' to irradiate the PALSLM 18, and the phase-modulated light image α(x, y) read out of the PALSLM 18 is made incident to the other end part of Fourier lens 26' to effect the Fourier transform thereof. Since the Fourier lens 26' is provided with both the essential function as a Fourier transform lens and the function as a collimator lens, the beam splitter 20 and collimator lens 24 both can be omitted, thus realizing simplification of configuration.

Since such exclusion of the beam splitter 20 can decrease the optical loss in this beam splitter 20, a sharper output image O(x, y) can be obtained. The incidence of the read light hv to the PALSLM 18 may be arranged to be done by another collimator lens different from the Fourier lens 26'.

As described above, this embodiment automatically compensates for the deviation characteristics from the ideal of the operation optical system and the optical loss, so that the actual output image O(x, y) can be made to match the desired target image G(x, y).

This image forming apparatus will demonstrate the excellent effect when applied to the holography technology by computer (CGH), the optical filtering technology, the optical modulation technology for separately controlling the phase and the amplitude of light, the high-precision laser processing technology, the use of stack of plural spatial light modulators, and so on.

(Second Embodiment)

The second embodiment of the present invention will be described.

The first embodiment described above used the Fourier lens 26 and inverse Fourier lens 30 capable of undergoing the two-dimensional Fourier transform. Therefore, the zero-order light component of the Fourier light image α(x, y) is concentrated in high energy density at the optic-axis position (the center position) of the phase contrast filter 28 placed on the Fourier plane. This could result in damaging the phase contrast filter 28 in applications using the laser light of high energy.

The second embodiment concerns an image forming apparatus that can form images by use of the laser light of high energy, solving the above problem.

Figure 7:
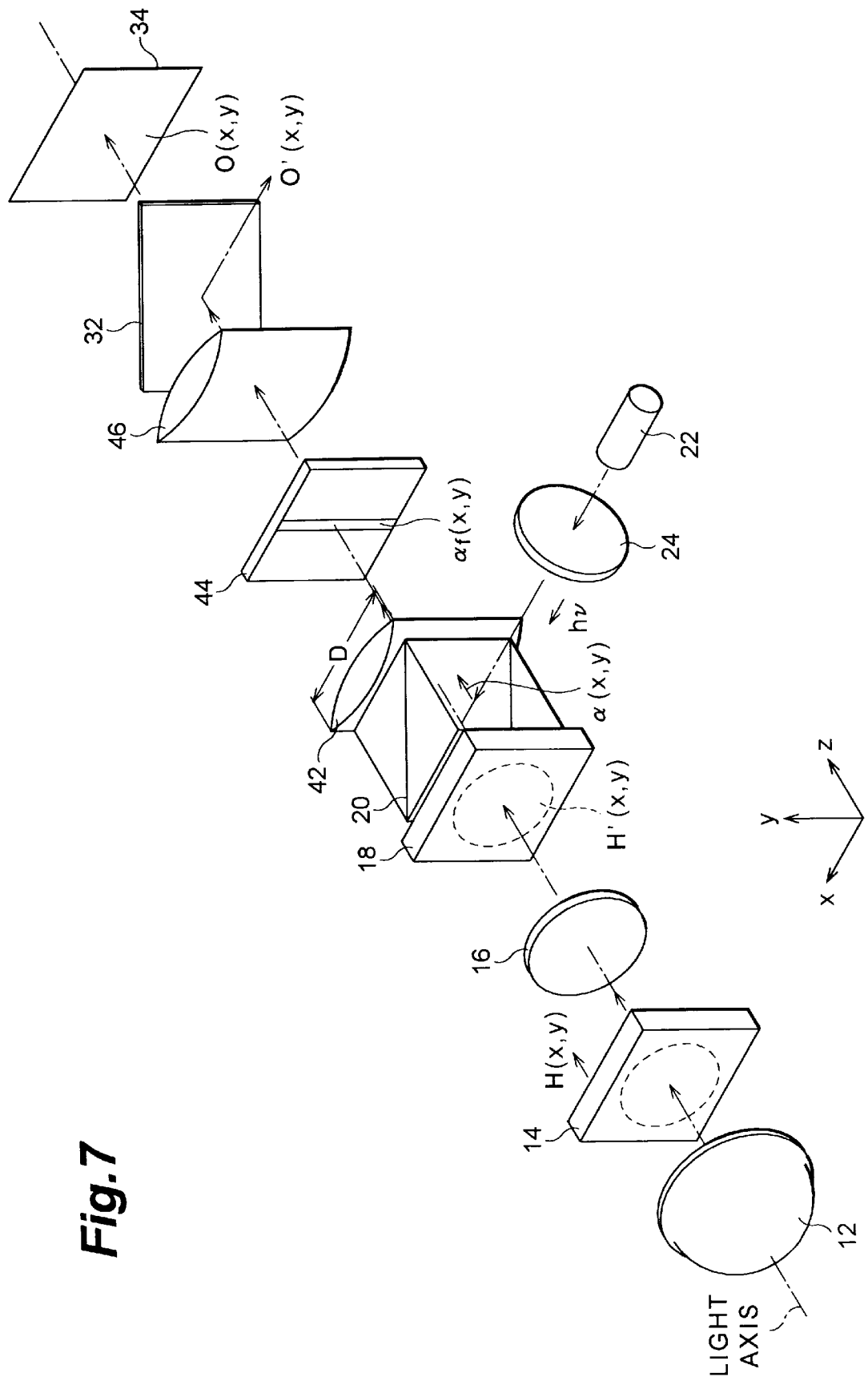
FIG. 7 is a perspective view to show the configuration of the second embodiment according to the present invention.

In FIG. 7 (of the perspective view) showing the configuration of the operation optical system, describing differences from the first embodiment, the Fourier lens 26 and inverse Fourier lens 30 in FIG. 1 are replaced by cylindrical lenses 42, 46 both having the focal length of f and the phase contrast filter 44 of different structure from the phase contrast filter 28 is provided on the Fourier plane of these cylindrical lenses 42, 46.

FIG. 8A is a side view of the configuration of this operation optical system, viewed in the x-coordinate direction, and FIG. 8B is a top plan view of the configuration thereof including the electrical control system, viewed in the y-coordinate direction.

The cylindrical lenses 42, 46 are positioned both perpendicular to the optic-axis direction z and in a common orientation on the xy coordinate plane. The first cylindrical lens 42 undergoes one-dimensional Fourier transform of the phase-modulated light image α(x, y) read out of the PALSLM 18. Therefore, striped Fourier light image α$_f$(x, y) extending in the y-coordinate direction is incident to the phase contrast filter 44. The second cylindrical lens 46 undergoes one-dimensional inverse Fourier transform of the spectrum light image phase-shifted by the phase contrast filter 44 to bring it back into the output light image of real image O(x, y), projecting it onto the output plane 34.

Figure 9A:
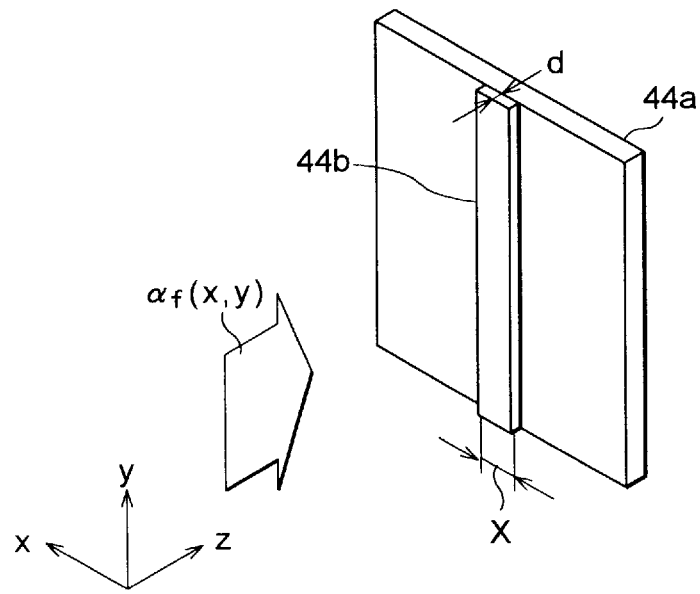
FIG. 9A, FIG. 9B, and FIG. 10 are perspective views to show structures of phase contrast filters in the second embodiment of FIG. 7.
Figure 9B:
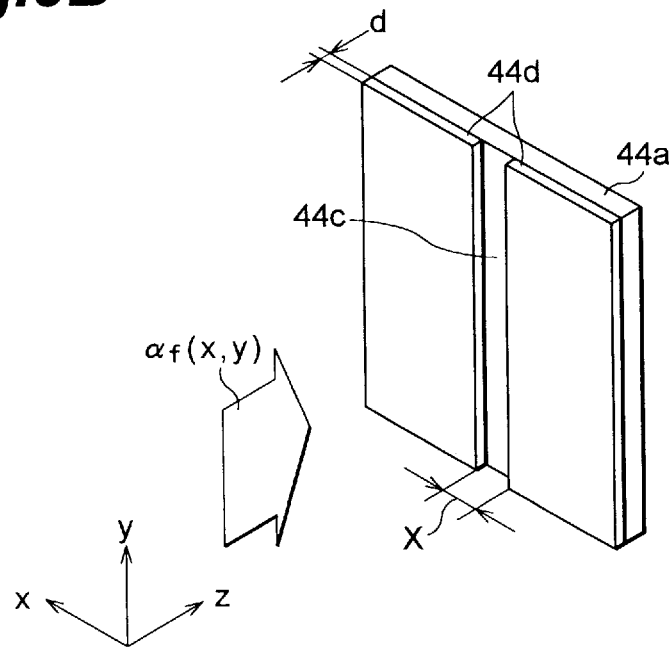
Figure 10:
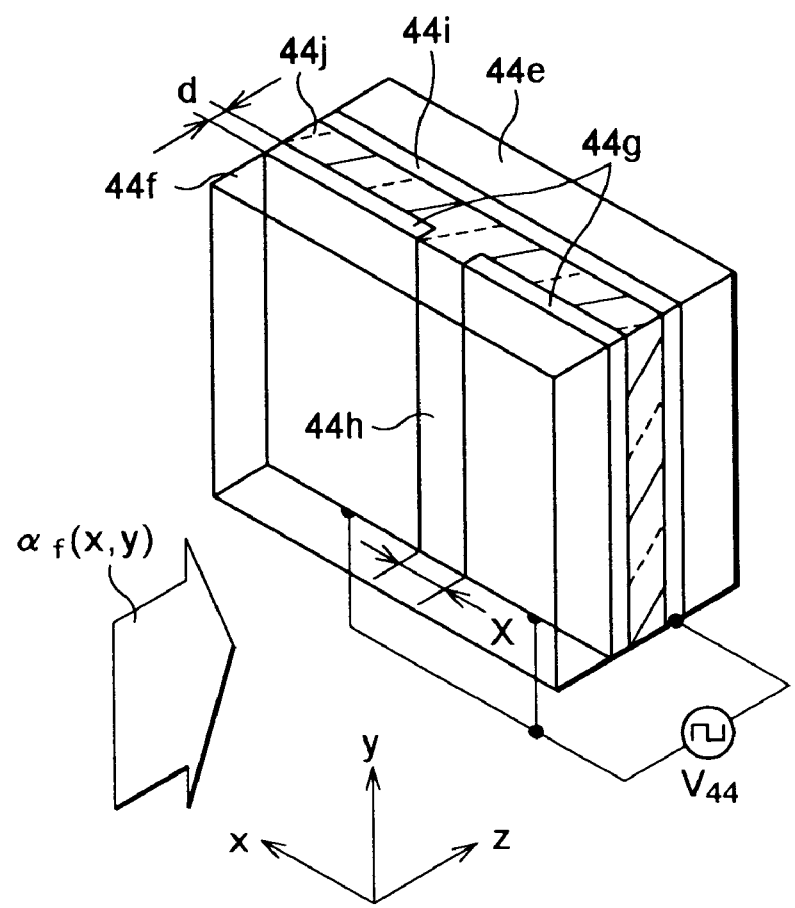

The phase contrast filter 44 is of a stationary type shown in FIG. 9A or 9B or of a variable control type shown in FIG. 10 to FIG. 12. The phase contrast filter 44 shown in FIG. 9A is so structured that a stripe of phase shift region 44b to which only the zero-order light component of the Fourier light image α$_f$(x, y) is made incident is made of a transparent electrode material (ITO) on a surface of transparent glass substrate 44a.

For example, it is made by first depositing the transparent electrode material (ITO) over the entire surface of transparent glass substrate 44a and then removing the transparent electrode material except for the portion to become the phase shift region 44b by etching or laser processing or the like. Further, the width X of this phase shift region 44b is designed according to X=fλ/D where λ is the wavelength of laser light hv, D is the lateral width (the width in the x-direction in FIG. 7) of the light collecting surface of the first cylindrical lens 42, and f the focal length thereof. The thickness d is so determined as to shift the phase of the zero-order light component by π.

The phase contrast filter 44 shown in FIG. 9B is so structured that a transparent electrode material layer 44d is deposited on the surface of the transparent glass plate 44a, except for a stripe of phase shift region 44c to which the zero-order light component of the Fourier light image α$_f$(x, y) is incident. The width X of the phase shift region 44c and the thickness d of the transparent electrode material layer 44d are designed in the same manner as in the phase contrast filter of FIG. 9A.

The phase contrast filter 44 of the variable control type shown in FIG. 10 is so structured that a liquid crystal layer 44j is interposed between transparent electrode material layers 44g, 44i placed on internal wall faces of parallel transparent glass substrates 44e, 44f. However, the transparent electrode material layer 44g is not given in a stripe of phase shift region 44h to which the zero-order light component of the Fourier light image α$_f$(x, y) is incident. The thickness d of the transparent electrode material layer 44g and the width X of the phase shift region 44h are designed in the same manner as in the phase contrast filter of FIG. 9A.

By variably controlling the voltage level and frequency of ac driving voltage V$_{44}$ from the control unit 100, applied between the transparent electrode material layers 44g and 44i, a desired phase shift can be given within the range of 0 to 2π to the zero-order light component of the Fourier light image α$_f$(x, y).

Figure 11A:
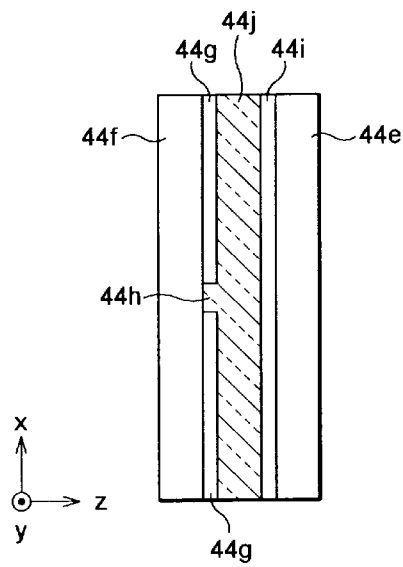
Figure 11B:
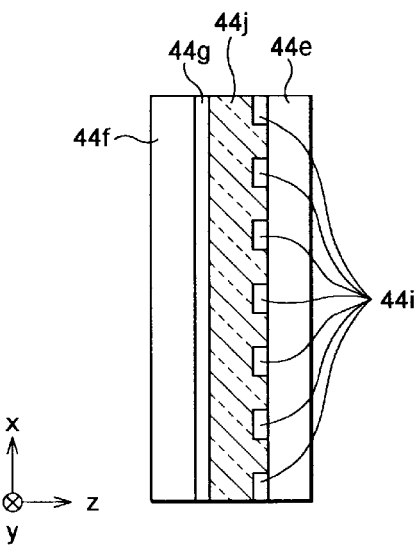
Figure 11C:
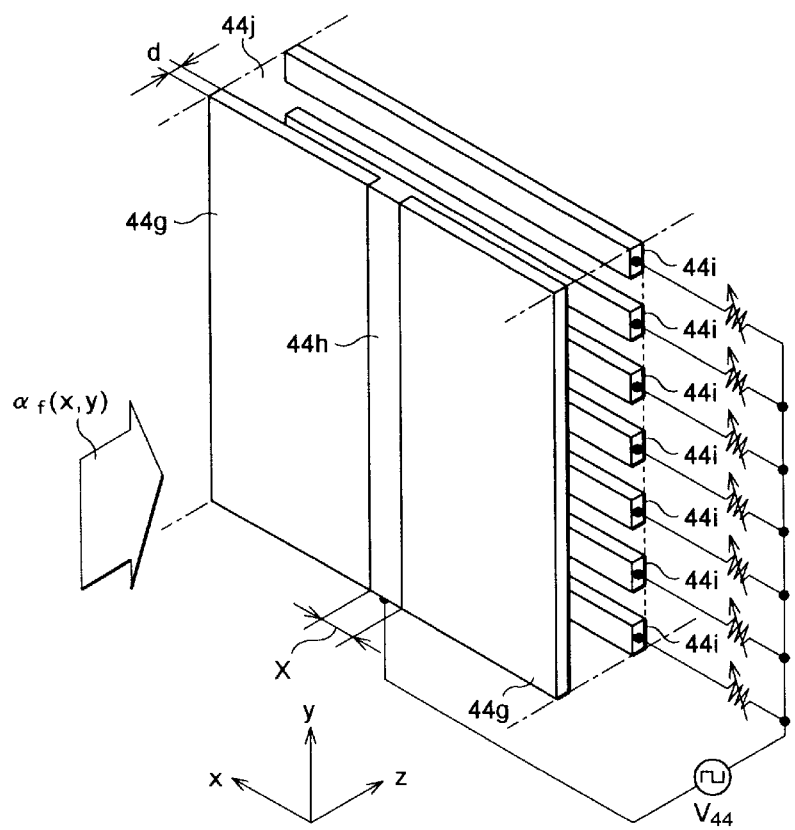

The phase contrast filter 44 shown in FIGS. 11A to 11C is so structured that the transparent electrode material layer 44i on the back surface side of the phase contrast filter shown in FIG. 10 is constructed in a shape of plural stripes. FIG. 11A is a lateral, cross-sectional view of the filter cut by the xz coordinate plane, FIG. 11B a longitudinal, cross-sectional view of the filter cut by the yz coordinate plane, and FIG. 11C a perspective view as a perspective projection of the major part.

The phase contrast filter 44 is so structured that the liquid crystal layer 44j is interposed between the transparent electrode material layers 44g, 44i provided on the internal wall faces of parallel transparent glass substrates 44e, 44f. However, the transparent electrode material layer 44g is not provided in the stripe of phase shift region 44h to which the zero-order light component of the Fourier light image α$_f$(x, y) is incident. The plurality of transparent electrode material layers 44i provided on the back surface side of the liquid crystal layer 44j are perpendicular to the phase shift region 44h. The width X of the phase shift region 44h and the thickness d of the transparent electrode material layer 44g are designed in the same manner as in the phase contrast filter of FIG. 10.

A variable resistor is connected to each transparent electrode material layer 44i and the ac driving voltage V$_{44}$ from the control unit 100 is applied through these variable resistors between the transparent electrode material layers 44g, 44i. Since a change in resistance of each variable resistor results in a change in intensity of electric field exerted on the liquid crystal layer 44j in the direction of arrangement of transparent electrode material layer 44i, different phase shifts in the direction of arrangement can be given to the zero-order light component of the Fourier light image α$_f$(x, y). For example, if ratios of white and black parts vary line by line, phase shifts suitable for the ratios of white and black parts can be given.

Figure 12A:
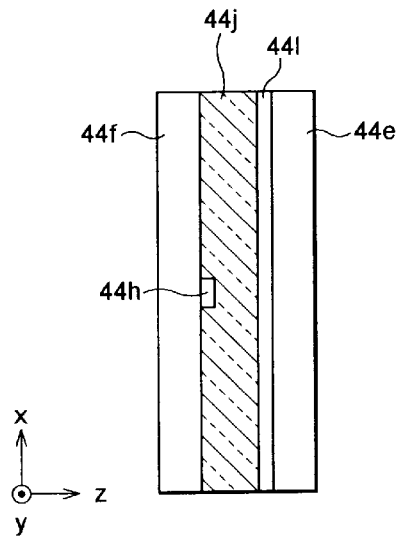
Figure 12B:
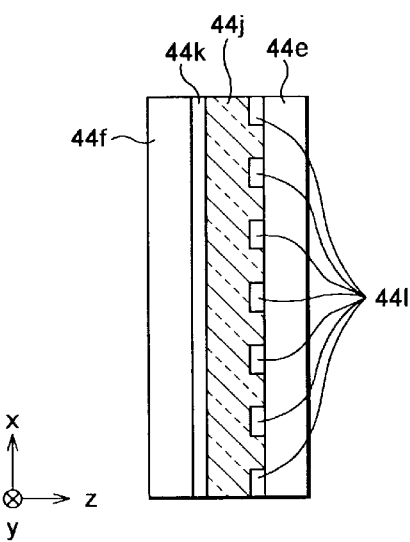
Figure 12C:
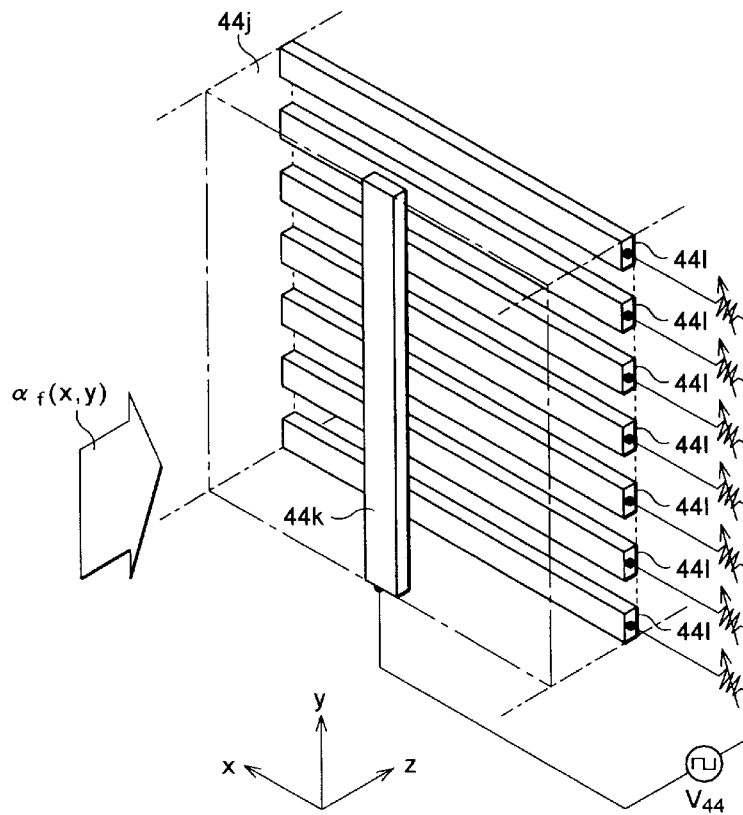

The phase contrast filter 44 shown in FIGS. 12A to 12C is so constructed that the phase shift region 44k to which the zero-order light component of the Fourier light image α$_f$(x, y) is incident is made of a transparent electrode material (ITO), a plurality of transparent electrode material layers 44l perpendicular to the phase shift region 44k are provided on the back surface side of liquid crystal layer 44j, and the whole is placed between transparent glass substrates 44f, 44e. FIG. 12A is a lateral, cross-sectional view of the filter cut by the xz coordinate plane, FIG. 12B a longitudinal, cross-sectional view of the filter cut by the yz coordinate plane, and FIG. 12C a perspective view as a perspective projection of the major part.

A variable resistor is connected to each transparent electrode material layer 44l and the ac driving voltage V$_{44}$ from the control unit 100 is applied through these variable resistors between the transparent electrode material layers 44l and the phase shift region 44k. Since adjustment of resistance of each variable resistor results in a change in the electric field in the liquid crystal layer 44j, different phase shifts in the direction of arrangement can be given to the zero-order light component of the Fourier light image α$_f$(x, y).

In the image forming apparatus of the present embodiment structured as described above, the first cylindrical lens 42 converts the phase-modulated light image α(x, y) read out of the PALSLM 18 into the striped Fourier light image α$_f$(x, y), so that the light of high energy density can be prevented from being concentrated at a point on the phase contrast filter 44. This can prevent damage of phase contrast filter 44, thus realizing the image forming apparatus using the high energy laser.

Further, when each optical element is adjusted by feedback control with the control unit 100 and evaluation value calculating unit 200 as in the first embodiment, the output image O(x, y) can be formed as being very close to the ideal state.

Figure 13:
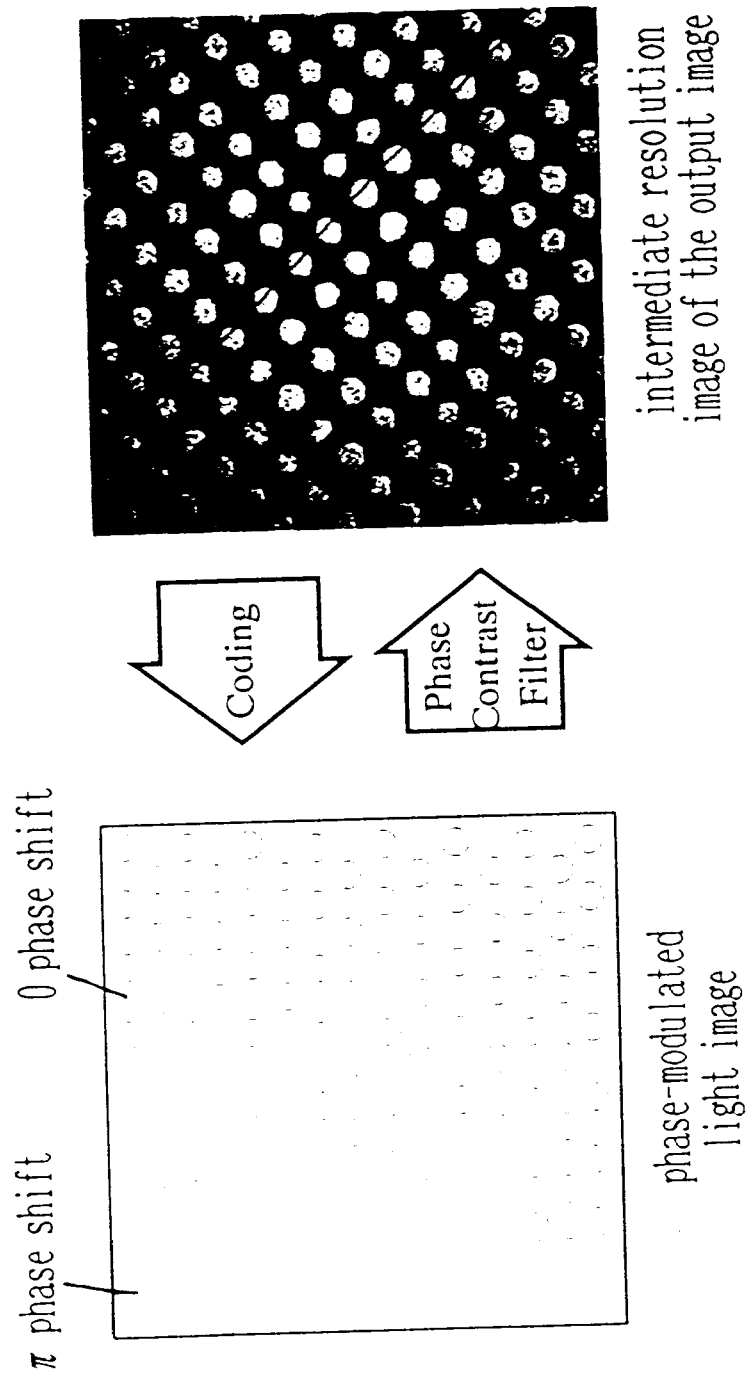
FIG. 13 is a drawing to show halftone images obtained by photographing a phase-modulated light image and an output image in the second embodiment of FIG. 7.

FIG. 13 shows results of experiment using the image forming apparatus. The left side of the drawing shows the phase-modulated light image α(x, y) phase-modulated by PALSLM 18 and the right side of the drawing shows an intermediate resolution image of the output image O(x, y) projected on the output plane 34. In this experiment, an array illuminator of white 25% and black 75% was displayed as the input image H(x, y) on the liquid-crystal display panel 14.

For this phase-modulated light image α(x, y), there is the relation of Eq. (10) below among duties of white level and black level, the complex mean value $\bar{\alpha}$ of the phase-modulated light image α(x, y), and the phase shift amount θ of the phase contrast filter 44.

$$Duty(White)\exp(i\pi) + Duty(Black)\exp(i0) = \bar{\alpha} \qquad (10)$$

$$= \left\{ 2\sin\left(\frac{\Theta}{2}\right) \right\}^{-1}$$

This means that the phase shift amount θ of the phase contrast filter 44 needs to be adjusted according to the duties of white level and black level. Since the duties of white and black were 25% and 75%, respectively, the PALSLM 18 was arranged to effect modulation of π on the white level and modulation of zero on the black level to set the phase shift amount of the phase contrast filter 44 as θ=π. As the result, the output image O(x, y) was formed with very good agreement with the target image G(x, y) and with good contrast, as shown in right side of FIG. 13. It was also confirmed that deviation of various characteristics of the optical elements from the ideal characteristics was compensated for by the feedback control of the control unit 100 and evaluation value calculating unit 200.

Modifications of FIG. 7 will be described. Each of FIG. 14A, FIG. 15A, and FIG. 16A is a side view of a modification viewed in the x-coordinate direction and each of FIG. 14B, FIG. 15B, and FIG. 16B is a top plan view of the modification viewed in the y-coordinate direction in correspondence thereto.

The modification shown in FIGS. 14A and 14B includes a third cylindrical lens 48 behind and in the vicinity of the phase contrast filter 44. This cylindrical lens 48 is arranged as rotated by 90° on the xy coordinate plane (perpendicularly) with respect to the first and second cylindrical lenses 42, 46. This configuration is effective in forming a sharp image with suppressing influence of diffraction.

The modifications shown in FIGS. 15A and 15B and FIGS. 16A and 16B are configured to realize the incidence of the read light hv to the PALSLM 18 and the output of the phase-modulated light image α(x, y) from the PALSLM 18 without provision of beam splitter. Specifically, the collimator lens 24 and first cylindrical lens 42 are arranged as offset at equal angle β (the maximum of which is approximately 2°) with respect to the PALSLM 18. The laser light source 22 is located to the collimator lens 24 and the phase contrast filter 44, the second cylindrical lens 46, and the output plane 34 are located behind the first cylindrical lens 42, thus composing the 4f optical system.

The laser light emitted from the laser light source 22 is changed to the read light hπ by the collimator lens 22 and the read light hπ directly enters the PALSLM 18. This read light hπ is phase-modulated by the PALSLM 18 and is reflected inside to be the phase-modulated light image α(x, y) and the phase-modulated light image is incident to the first cylindrical lens 42.

Such configuration can greatly decrease optical losses of the read light hv and phase-modulated light image α(x, y). This increases the light utilization efficiency, so that sharper output image O(x, y) can be formed. In addition, the image forming apparatus using the high energy laser can be realized. If the feedback control of each optical element is employed with provision of the control unit 100 and evaluation value calculating unit 200 as in FIGS. 8A and 8B, though not illustrated in FIGS. 15A and 15B, the output image O(x, y) close to the ideal state can be formed while compensating for the characteristic deviation of actual optical elements.

In the modification shown in FIGS. 15A and 15B, the condenser lens 24 is located in a direction (specifically, the x-coordinate direction) perpendicular to the longitudinal direction (specifically, the y-coordinate direction) of the stripe of phase shift region provided in the phase contrast filter 44. In contrast with it, in the modification shown in FIGS. 16A and 16B, the condenser lens 24 is located along the longitudinal direction (specifically, the y-coordinate direction) of the stripe of phase shift region provided in the phase contrast filter 44. Accordingly, the placement of the first and second cylindrical lenses 42, 46 and the phase contrast filter 44 in the apparatus of FIGS. 15A and 15B is in the relation of rotation of 90° from that in the apparatus of FIGS. 16A and 16B.

In the modification of FIGS. 16A and 16B, since the collimator lens 24 is located in the longitudinal direction of the first cylindrical lens 42 (or in the direction not contributing to the Fourier transform), slight deviation of position of the collimator lens 24 in this direction will not result in greatly degrading the characteristics of the total optical system. Therefore, the modification of FIGS. 16A and 16B has an advantage that optical adjustment becomes easier than in the modification of FIGS. 15A and 15B.

(Third Embodiment)

The third embodiment of the present invention will be described referring to FIGS. 17A and 17B. FIG. 17A is a side view of the apparatus viewed in the x-coordinate direction and FIG. 17B is a top plan view of the apparatus viewed in the y-coordinate direction.

The first and second embodiments are configured to effect phase coding of the input image H(x, y) to the phase-modulated light image α(x, y) by use of the display means as a combination of the liquid crystal display panel 14 with the PALSLM 18. The third embodiment adopts the display means realized in another configuration.

In FIGS. 17A and 17B, phase modulation type liquid-crystal display panel 50 is disposed at the position of the front focal point of the first cylindrical lens 42, the laser light emitted from the laser light source 22 is converted to the read light hv of parallel light by the collimator lens 24, and the read light hv is made to pass through the liquid crystal display panel 50. This read light hv is phase-modulated according to the input image H(x, y) displayed in the liquid crystal display panel 50 to become the phase-modulated light image α(x, y) and to be guided into the first cylindrical lens 42. Then the zero-order light component of the Fourier light image $\alpha_f$(x, y) is phase-shifted by the phase contrast filter 44, it is then subject to the inverse Fourier transform in the second cylindrical lens 46 to become the output image of real image O(x, y), and the output image is projected to the output plane 34.

The apparatus is provided with the control unit 100, the evaluation value calculating unit 200, and the memory section 300 as in FIGS. 8A and 8B, though not illustrated in FIGS. 17A and 17B, to display the input image H(x, y)

theoretically obtained from the desired target image G(x, y) and to perform the feedback control of each optical element.

Since this embodiment excludes the PALSLM, it has an effect that the operation optical system can be simplified.

(Fourth Embodiment)

The fourth embodiment of the present invention will be described.

In the first to the third embodiments, the phase shift region of the phase contrast filter 28, 44 placed on the Fourier plane is formed in such a geometric shape as to make only the zero-order light component of Fourier light image $\alpha_f(x, y)$ incident thereto. However, since the width of the spectrum distribution of this zero-order light component is extremely narrow, the processing technology of very high accuracy is necessitated. In addition, adjustment of optic axis with high accuracy is also necessitated. When the diameter of the Fourier light image $\alpha_f(x, y)$ changes, the shape and position of the phase shift region cannot be changed. It is thus not easy to be ready for a variety of image forming processes. The fourth embodiment solved this problem.

Figure 18:
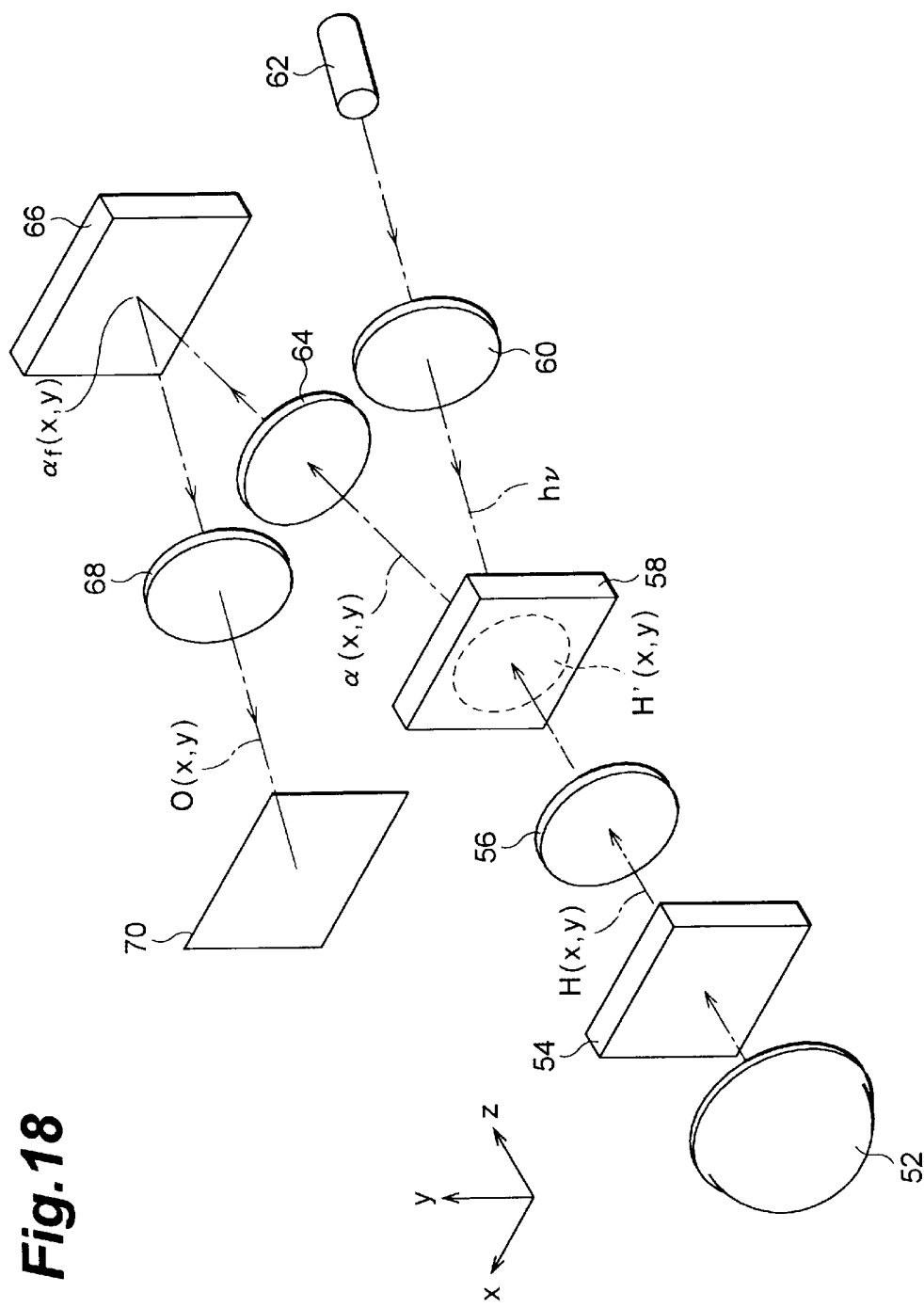
FIG. 18 is a perspective view to show the configuration of the fourth embodiment according to the present invention.
Figure 19:
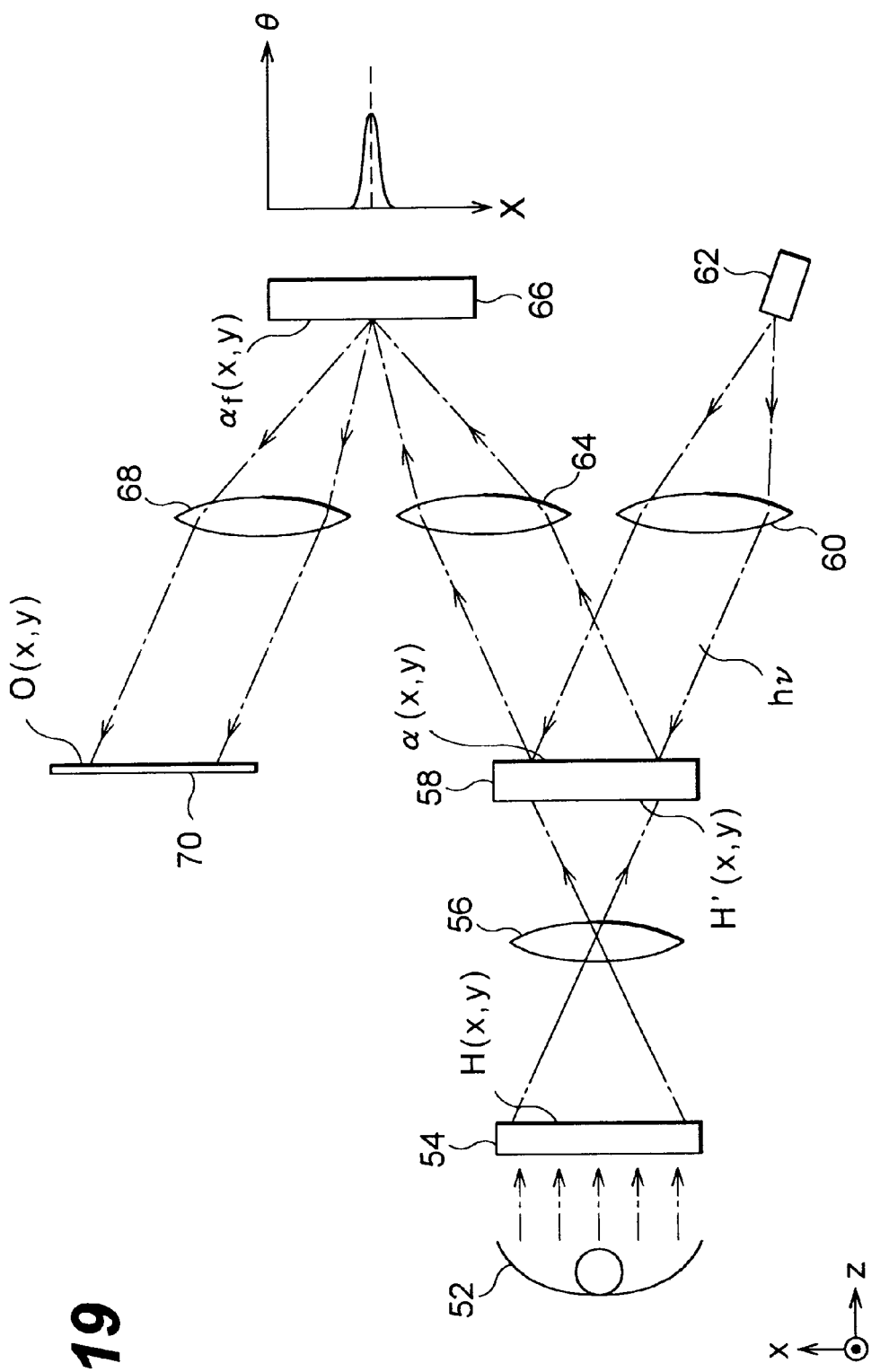
FIG. 19 is a side view of the configuration of FIG. 18, viewed in the y-coordinate direction.

The fourth embodiment, as shown in the perspective view thereof in FIG. 18 and in the side view thereof in FIG. 19, comprises illumination light source 52 for emitting the illumination light of white light or the like with no peak at a specific wavelength in the visible light region and with uniform illuminance, transmission type liquid-crystal display panel 54 for displaying the input image H(x, y), and imaging lens 56 for forming the two-dimensional intensity light image H'(x, y), which appears when the illumination light is transmitted by the liquid crystal display panel 54, on the input plane of PALSLM 58, thus composing the image writing optical system.

Further, the apparatus comprises condenser lens 60 and laser light source 62 for radiating the coherent read light hv to the output plane of PALSLM 58, Fourier lens 64 for undergoing the Fourier transform of the phase-modulated light image $\alpha(x, y)$ emergent from the PALSLM 58, phase contrast filter 66, disposed on the Fourier plane, for phase-shifting and reflecting the Fourier light image $\alpha_f(x, y)$, inverse Fourier lens 68 for undergoing the inverse Fourier transform of the spectrum light image phase-shifted by the phase contrast filter 66, and output plane 70 onto which the output image O(x, y) as a real image changed by the inverse Fourier transform is projected, thus composing the filtering optical system.

Here, the PALSLM 58 is the parallel aligned liquid-crystal spatial light modulator described in the first and second embodiments, and the condenser lens 60 and Fourier lens 64 are positioned so as to equalize an angle of incidence of the read light hv to the PALSLM 58 to an angle of emergence of the phase-modulated light image $\alpha(x, y)$ therefrom.

Figure 20:
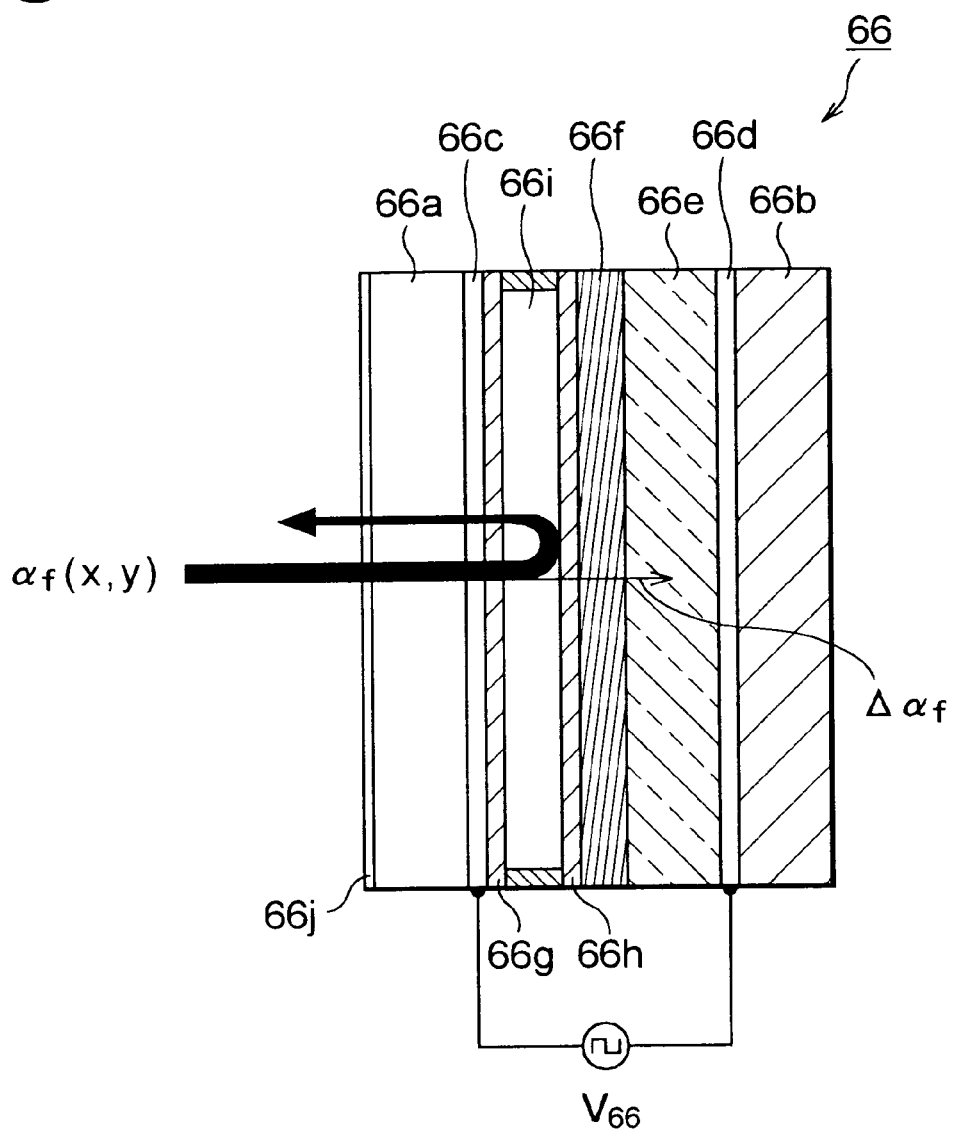
FIG. 20 is a longitudinal, cross-sectional view to schematically show the structure of the phase contrast filter of FIG. 18.

The phase contrast filter 66 is structured as schematically shown in the longitudinal, cross-sectional view of FIG. 20. Specifically, it has such sandwich structure that photoconductor layer 66e, dielectric multilayer film mirror 66f, and light modulating material layer 66i placed between orientational layers 66g, 66h are interposed between transparent, conductive films (ITO) 66c, 66d deposited inside parallel transparent glass substrate 66a and opaque glass substrate 66b. Further, nonreflective coat 66j is provided on the outside wall of transparent glass substrate 66a. The photoconductor layer 66e is made, for example, of hydrogenated amorphous silicon (a-Si:H) and the light modulating material layer 66i is made, for example, of a material such as the nematic liquid crystal of the parallel alignment type.

Further, the longitudinal or lateral width W of phase contrast filter 66 (the longitudinal or lateral width of the end face to which the Fourier light image $\alpha_f((x, y)$ is incident) is determined as follows.

$$W > f \lambda D \quad (11)$$

Here, f is the focal length of Fourier lens 64, $\lambda$ the center wavelength of the read light hv, and D the maximum width of the phase-modulated light image $\alpha(x, y)$.

The intensity of the zero-order light is given as the Eqs. (5) and (6). When $|\alpha|$ equals to 0.5, the intensity of the zero-order light has 50% energy of the input image. The size of the first order is about $f\lambda/D$, where $\lambda$ is the wavelength of the read light, f is the focal length of Fourier lens 26 and D is the expanded beam diameter before the Foureier lens 26.

The dielectric multilayer film mirror 66f has the stack structure of dielectric thin films and is so designed as to reflect, for example, 99.95% of the zero-order light component of the Fourier light image $\alpha_f(x, y)$ and to transmit the rest, 0.05% thereof, depending upon the number of dielectric thin film layers.

When the Fourier light image $\alpha_f(x, y)$ is incident to the dielectric multilayer film mirror 66f, 0.05% of the zero-order light component passes (or leaks) through the dielectric multilayer film mirror 66f to enter the photoconductor layer 66e, causing an impedance change in the incident portion of this leak light $\Delta\alpha_f$, according to the light intensity thereof. This impedance change of the photoconductor layer 66e causes a change of field intensity, whereby the light modulating material layer 66i is made to have an orientation according to the light intensity of the zero-order light component. The remaining part of Fourier light image $\alpha_f(x, y)$ is reflected by the dielectric multilayer film mirror 66f to be outputted through the light modulating material layer 66i to the transparent glass substrate 66a. Here, the zero-order light component is phase-shifted by the aforementioned orientation during passage through the light modulating material layer 66i.

As described above, the phase contrast filter 66 automatically sets the phase shift amount $\theta$ and the phase shift region according to the light intensity of the zero-order light component of the Fourier light image $\alpha_f(x, y)$ and outputs the zero-order light component with shifting the phase thereof by the phase shift amount $\theta$. Therefore, positioning of the phase contrast filter is unnecessary, stability of optical system is enhanced greatly, and the apparatus can be applied to formation of images having various shapes without being limited to specific images. In addition, the phase shift amount e can be adjusted by variably controlling the voltage level or the frequency of the ac driving voltage $V_{66}$ applied to the transparent electrode films 66c, 66d.

Then the spectrum light image outgoing from the phase contrast filter 66 is subject to the inverse Fourier transform in the inverse Fourier lens 68 to be the output image O(x, y) of real image, which is projected to the output plane 70.

Figure 21:
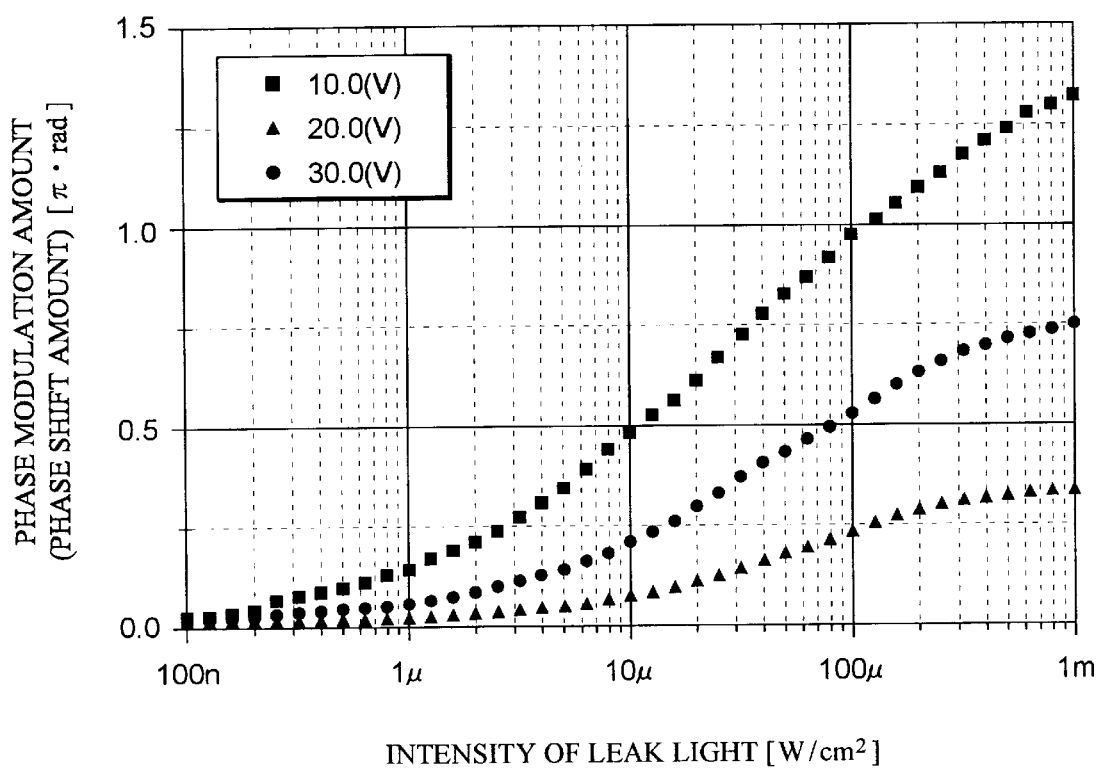
FIG. 21 is an input/output characteristic diagram of the phase contrast filter of FIG. 20.

FIG. 21 is an input/output characteristic diagram of the phase contrast filter 66, showing the relation of phase shift amount $\theta$ to intensity of leak light with a parameter of ac driving voltage $V_{66}$. As apparent from FIG. 21, phase shift amounts $\theta$ are almost proportional to logarithms of quantity of incident light (quantity of leak light) and come to saturate after the light quantity becomes over a certain level. Further, the filter also has such a characteristic that changing of the ac driving voltage $V_{66}$ results in changing the saturation value of phase shift amount $\theta$.

Therefore, carried out in practical use is a process of finely adjusting the phase shift amount $\theta$, for example, by preliminarily setting a desired phase shift amount $\theta$ by the ac driving voltage $V_{66}$ or by performing the feedback control of this ac driving voltage $V_{66}$ so as to make the output image O(x, y) matched with the desired target image G(x, y) as monitoring the output image.

Let us consider a specific example. Supposing the wavelength of read light hv is 633 μm, the intensity thereof is 1 mW/cm², the diameter D thereof is 1 cm, the focal length f of the Fourier lens 64 is 400 mm, and the zero-order light intensity of the Fourier light image $α_f$(x, y) is coded to 50%. Then the average intensity Ī of the zero-order light component and the spot diameter $r_o$ are calculated as follows.

$$\bar{I} = |\bar{\alpha}| \times I_{input} \times (\pi D^2) \quad (12)$$
$$= 0.5 \times (1 \times 10^{-3}) \times (\pi \times 0.5^2)$$
$$= 4 \times 10^{-4} [W]$$

$$r_0 = f\lambda/D' = 25[\mu m] \quad (13)$$

If the transmittance of the dielectric multilayer film mirror 66f of the phase contrast filter 66 is 99.95%, the intensity of the leak light $Δα_f$ is 2×10⁵ mW/cm². It is seen from the characteristic diagram (FIG. 21) that sufficient phase shift amounts θ can be obtained even with such weak leak light $Δα_f$. Therefore, the optical loss of the phase contrast filter 66 is negligible, thereby achieving excellent light utilization efficiency.

If each optical element is subjected to the feedback control by the control unit 100 and the evaluation value calculating unit 200 as in the first embodiment, the output image O(x, y) can be formed as being very close to the ideal state.

Figure 22:
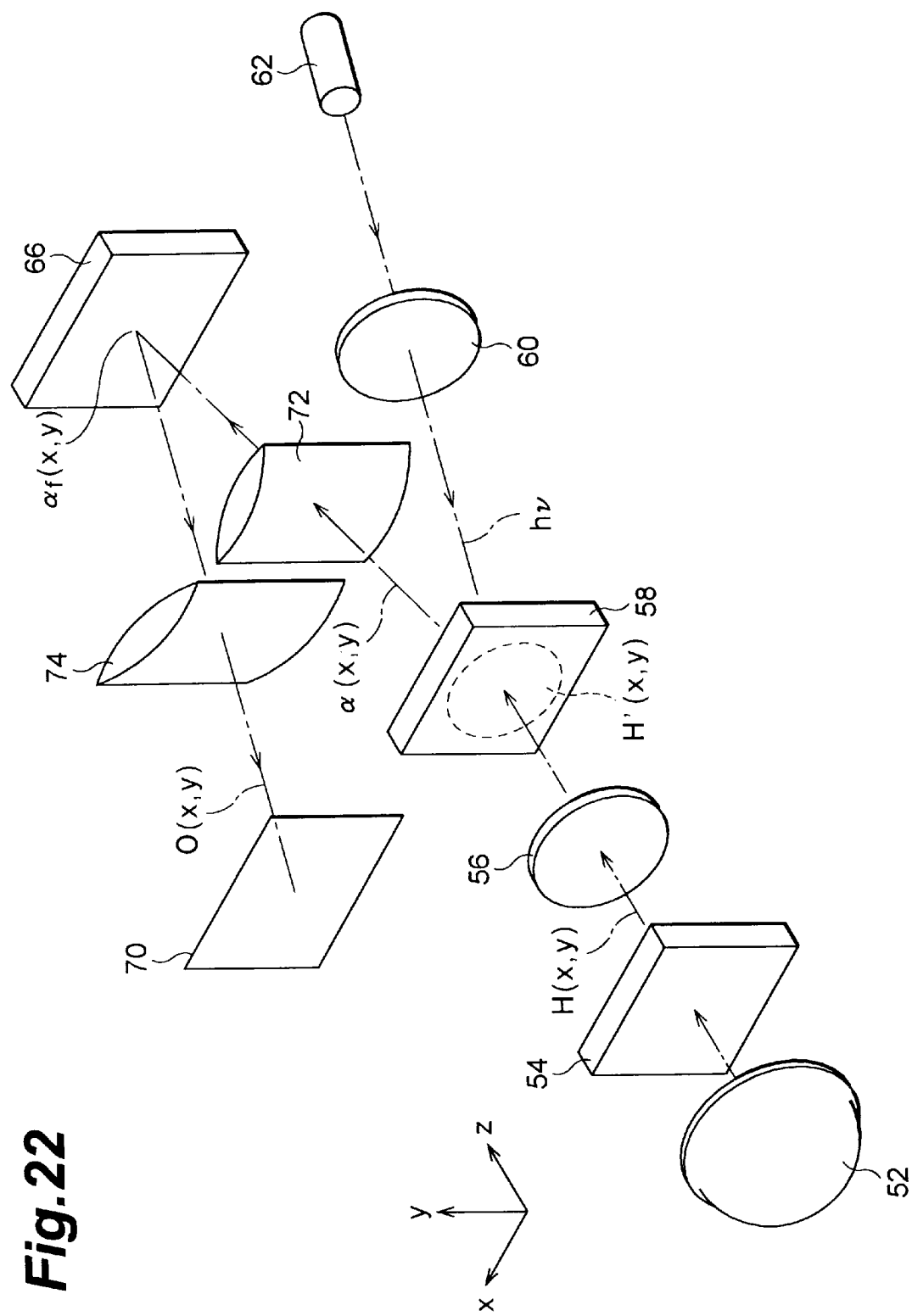
FIG. 22 is a perspective view to show the configuration of a modification of the fourth embodiment of FIG. 19.

A modification of the present embodiment will be described referring to FIG. 22. In FIG. 22 identical or equivalent portions to those in FIG. 18 are denoted by the same reference symbols. This modification uses cylindrical lenses 72, 74, in place of the Fourier lenses 64, 68 for the two-dimensional Fourier transform, to construct the 4 f optical system. According to this configuration, the first cylindrical lens 72 undergoes the one-dimensional Fourier transform of the phase-modulated light image α(x, y) of PALSLM 58 and striped Fourier light image $α_f$(x, y) thereof is formed on the phase contrast filter 66. Therefore, the phase contrast filter 66 can be prevented from being damaged. In addition, the modification enables image formation utilizing the high energy laser.

Figure 23:
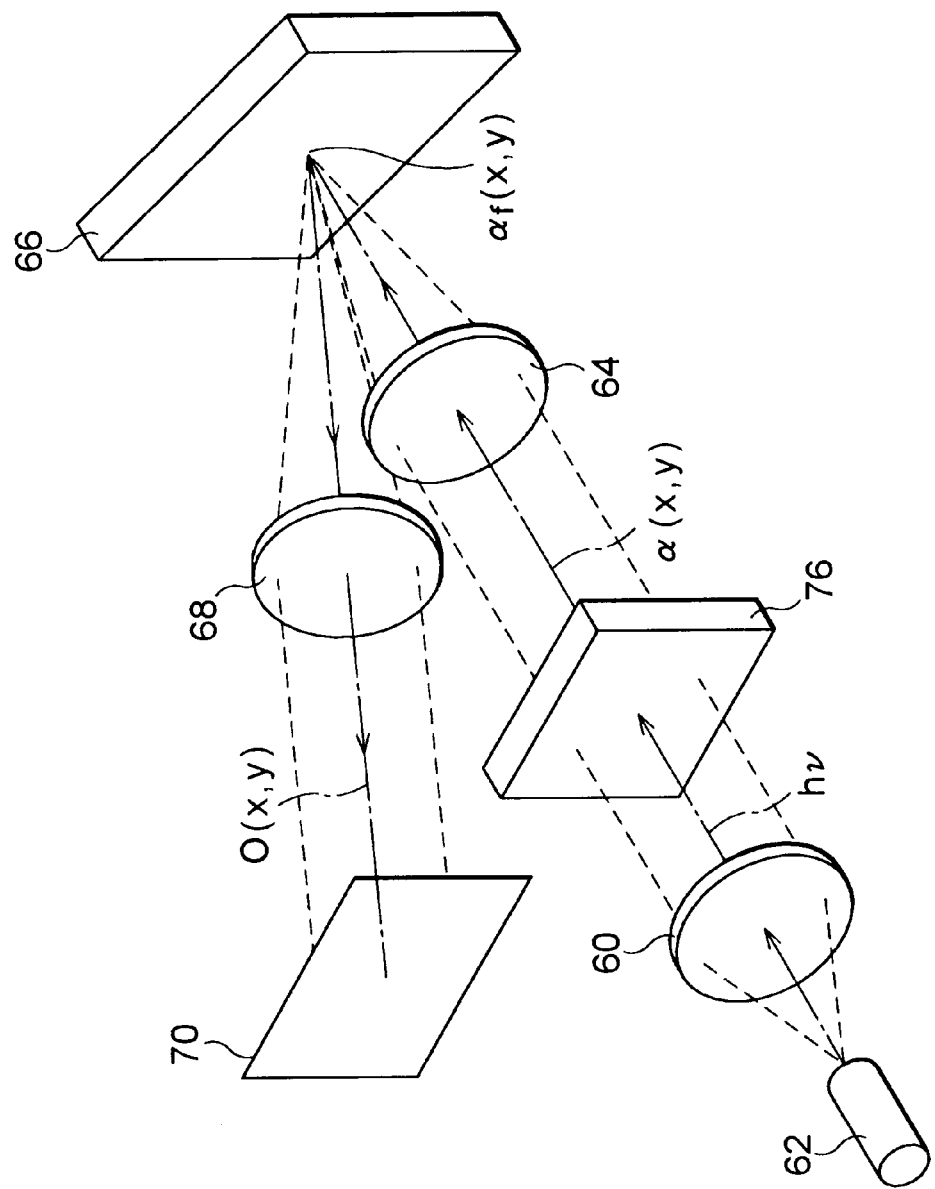
FIG. 23 is a perspective view to show the configuration of another modification of the fourth embodiment of FIG. 19.
Figure 24A:
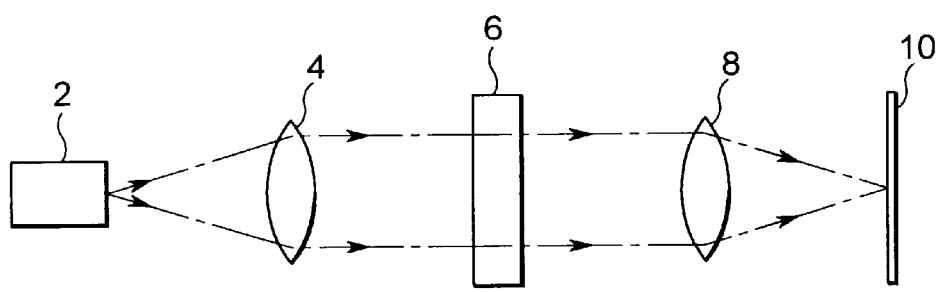
FIG. 24A is a schematic diagram to show the configuration of the conventional image forming optical system and FIG. 24B is a drawing to show a halftone image obtained by photographing the Fourier light image obtained by the optical system.
Figure 24B:
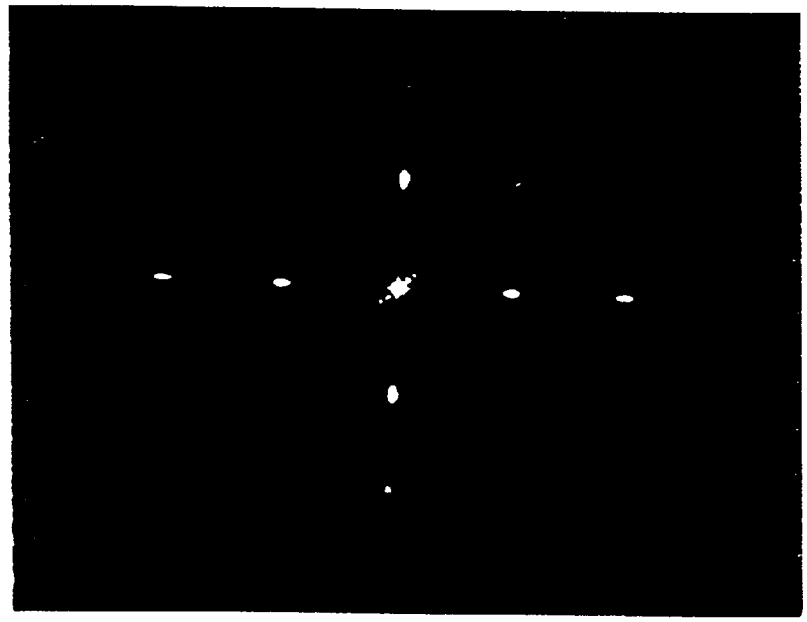

Another modification of the present embodiment will be described referring to FIG. 23. This modification is so configured that the phase modulation type liquid-crystal display panel 76 is located at the position of the front focal point of the Fourier lens 64 and the coherent read light hv emitted from the collimator lens 60 and laser light source 62 is made to pass the input light image H(x, y) displayed on the liquid crystal display panel 76, thereby generating the phase-modulated light image α(x, y).

Since this modification excludes the PALSLM, it has the effect that the operation optical system can be simplified.

Each embodiment described above was configured to form the two-dimensional intensity light image H'(x, y) by use of the light transmission type liquid-crystal display panel, but, without having to be limited to the configuration, the present invention may adopt a configuration to generate the two-dimensional intensity image H'(x, y) by spontaneous light without use of illumination means by displaying the input image on a self-emission type display device such as an EL panel or a plasma display panel.

The above description showed the configurations using the PALSLM as a spatial light modulator, but the spatial light modulator of the present invention is not limited to this. For example, it can be selected from liquid-crystal spatial light modulators utilizing the twist nematic liquid crystal (TNLC), the ferroelectric liquid crystal (FLC), and the like, and optical address type or electrical address type spatial light modulators utilizing various light modulating materials such as electrooptic crystals.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image forming apparatus for forming a two-dimensional optical image, based on electric image information, comprising:

an operation optical system, said operation optical system having at least a light transmission type display device for, based on said electric image information, displaying a two-dimensional input image corresponding thereto, an illumination device for radiating illumination light to the display image on said display device, read light generating means for emitting coherent read light, optical address type two-dimensional spatial light modulating means irradiated by a two-dimensional intensity light image formed according to said two-dimensional input image by said illumination light transmitted by said display device, said spatial light modulating means phase-modulating the read light radiated from said read light generating means according to a spatial light intensity distribution of the two-dimensional intensity light image to output a two-dimensional phase-modulated light image having a spatial light intensity distribution, a Fourier lens for converting said phase-modulated light image to a Fourier light image, a phase contrast filter, provided on a Fourier plane of said Fourier lens, for phase-shifting a zero-order light component of said Fourier light image, and an inverse Fourier lens for undergoing inverse Fourier transform of said Fourier light image to output said optical image; and operation controlling means for applying a desired ideal image to be formed as said optical image to a theoretical characteristic of said operation optical system, thereby reversely calculating said electric image information.

2. An image forming apparatus according to claim 1, wherein said Fourier lens and inverse Fourier lens are lenses for two-dimensional Fourier transform.

3. An image forming apparatus according to claim 1, wherein said Fourier lens is a first lens for one-dimensional Fourier transform, said inverse Fourier lens is a second lens for one-dimensional inverse Fourier transform, and a Fourier transform plane of said first lens and an inverse Fourier transform plane of said second lens are arranged in a same orientation.

4. An image forming apparatus according to claim 3, wherein a third lens having the same optical characteristics as said first lens is positioned perpendicular to said first lens.

5. An image forming apparatus according to claim 1, wherein said phase contrast filter is a transmission type filter for transmitting said Fourier light image.

6. An image forming apparatus according to claim 1, wherein said phase contrast filter is a reflection type filter for reflecting said Fourier light image.

7. An image forming apparatus according to claim 1, wherein said phase contrast filter has such structure that a dielectric multilayer film having a predetermined light transmittance is interposed between a light modulating material layer biased at a predetermined voltage and a photoconductor layer and that said Fourier light image is made incident to said light modulating material layer and is reflected by the dielectric multilayer film to be outputted, and wherein a part of the zero-order light component of said Fourier light image transmitted by said dielectric multilayer film changes an electric characteristic of said photoconductor layer, thereby changing a birefringence distribution of said light modulating material layer, and said light modulating material layer phase-shifts and outputs said Fourier light image reflected by the dielectric multilayer film.

8. An image forming apparatus according to claim 1, wherein said operation controlling means comprises:

evaluation value calculating means for observing the optical image outputted from said inverse Fourier lens to evaluate conformity between said optical image and said desired ideal image, and variable control means for variably controlling an optical characteristic of said operation optical system, based on a result of said evaluation by said evaluation value calculating means.

9. An image forming apparatus for forming a two-dimensional optical image, based on electric image information, comprising:

an operation optical system, said operation optical system having at least a self-emission type display device for, based on said electric image information, radiating a two-dimensional intensity image corresponding thereto, read light generating means for emitting coherent read light, an optical address type two-dimensional spatial light modulator irradiated by the two-dimensional intensity light image produced by said display device, said spatial light modulator phase-modulating the read light radiated from said read light generating means according to a spatial light intensity distribution of the two-dimensional intensity light image to output a phase-modulated light image having a spatial light intensity distribution, a Fourier lens for converting said phase-modulated light image to a Fourier light image, a phase contrast filter, provided on a Fourier plane of said Fourier lens, for phase-shifting a zero-order light component of said Fourier light image, and an inverse Fourier lens for undergoing inverse Fourier transform of said Fourier light image to output said optical image; and operation controlling means for applying a desired ideal image to be formed as said optical image to a theoretical characteristic of said operation optical system, thereby reversely calculating said image information.

10. An image forming apparatus according to claim 9, wherein said Fourier lens and inverse Fourier lens are lenses for two-dimensional Fourier transform.

11. An image forming apparatus according to claim 9, wherein said Fourier lens is a first lens for one-dimensional Fourier transform, said inverse Fourier lens is a second lens for one-dimensional inverse Fourier transform, and a Fourier transform plane of said first lens and an inverse Fourier transform plane of said second lens are arranged in a same orientation.

12. An image forming apparatus according to claim 11, wherein a third lens having the same optical characteristics as said first lens is positioned perpendicular to said first lens.

13. An image forming apparatus according to claim 9, wherein said phase contrast filter is a transmission type filter for transmitting said Fourier light image.

14. An image forming apparatus according to claim 9, wherein said phase contrast filter is a reflection type filter for reflecting said Fourier light image.

15. An image forming apparatus according to claim 9, wherein said phase contrast filter has such structure that a dielectric multilayer film having a predetermined light transmittance is interposed between a light modulating material layer biased at a predetermined voltage and a photoconductor layer and that said Fourier light image is made incident to said light modulating material layer and is reflected by the dielectric multilayer film to be outputted, and wherein a part of the zero-order light component of said Fourier light image transmitted by said dielectric multilayer film changes an electric characteristic of said photoconductor layer, thereby changing a birefringence distribution of said light modulating material layer, and said light modulating material layer phase-shifts and outputs said Fourier light image reflected by the dielectric multilayer film.

16. An image forming apparatus according to claim 9, wherein said operation controlling means comprises:

evaluation value calculating means for observing the optical image outputted from said inverse Fourier lens to evaluate conformity between said optical image and said desired ideal image, and variable control means for variably controlling an optical characteristic of said operation optical system, based on a result of said evaluation by said evaluation value calculating means.

17. An image forming apparatus for forming an optical image, based on electric image information, comprising:

an operation optical system, said operation optical system having at least read light generating means for emitting coherent read light, an electrical address type two-dimensional spatial light modulator for phase-modulating said read light according to said electric image information to output a two-dimensional phase-modulated light image having a spatial light intensity distribution, a Fourier lens for undergoing Fourier transform of said phase-modulated light image to a Fourier light image, a phase contrast filter, provided on a Fourier plane of said Fourier lens, for phase-shifting a zero-order light component of said Fourier light image, and an inverse Fourier lens for undergoing inverse Fourier transform of said Fourier light image to output said optical image; and operation controlling means for applying a desired ideal image to be formed as said optical image to a theoretical characteristic of said operation optical system, thereby reversely calculating said image information.

18. An image forming apparatus according to claim 17, wherein said two-dimensional spatial light modulator is a liquid-crystal display panel.

19. An image forming apparatus according to claim 17, wherein said Fourier lens and inverse Fourier lens are lenses for two-dimensional Fourier transform.

20. An image forming apparatus according to claim 17, wherein said Fourier lens is a first lens for one-dimensional Fourier transform, said inverse Fourier lens is a second lens for one-dimensional inverse Fourier transform, and a Fourier transform plane of said first lens and an inverse Fourier transform plane of said second lens are arranged in a same orientation.

21. An image forming apparatus according to claim 20, wherein a third lens having the same optical characteristics as said first lens is positioned perpendicular to said first lens.

22. An image forming apparatus according to claim 17, wherein said phase contrast filter is a transmission type filter for transmitting said Fourier light image.

23. An image forming apparatus according to claim 17, wherein said phase contrast filter is a reflection type filter for reflecting said Fourier light image.

24. An image forming apparatus according to claim 17, wherein said phase contrast filter has such structure that a dielectric multilayer film having a predetermined light transmittance is interposed between a light modulating material layer biased at a predetermined voltage and a photoconductor layer and that said Fourier light image is made incident to said light modulating material layer and is reflected by the dielectric multilayer film to be outputted, and wherein a part of the zero-order light component of said Fourier light image transmitted by said dielectric multilayer film changes an electric characteristic of said photoconductor layer, thereby changing a birefringence distribution of said light modulating material layer, and said light modulating material layer phase-shifts and outputs said Fourier light image reflected by the dielectric multilayer film.

25. An image forming apparatus according to claim 17, wherein said operation controlling means comprises:

evaluation value calculating means for observing the optical image outputted from said inverse Fourier lens to evaluate conformity between said optical image and said desired ideal image, and variable control means for variably controlling an optical characteristic of said operation optical system, based on a result of said evaluation by said evaluation value calculating means.

* * * * *